US011636672B2

(12) United States Patent
Sinha et al.

(10) Patent No.: US 11,636,672 B2
(45) Date of Patent: Apr. 25, 2023

(54) CROP PHENOLOGY ESTIMATION AND TRACKING WITH REMOTE SENSING IMAGERY

(71) Applicant: A.U.G. SIGNALS LTD., Toronto (CA)

(72) Inventors: Abhijit Sinha, Thornhill (CA); Weikai Tan, North York (CA); Yifeng Li, Burlington (CA)

(73) Assignee: A.U.G. SIGNALS LTD.

( * ) Notice: Subject to any disclaimer, the term of this patent is extended or adjusted under 35 U.S.C. 154(b) by 234 days.

(21) Appl. No.: 17/068,267

(22) Filed: Oct. 12, 2020

(65) Prior Publication Data

US 2021/0110157 A1 Apr. 15, 2021

Related U.S. Application Data

(60) Provisional application No. 62/915,071, filed on Oct. 15, 2019.

(51) Int. Cl.
*G06V 20/20* (2022.01)
*G06V 20/10* (2022.01)
*G06T 7/00* (2017.01)

(52) U.S. Cl.
CPC .......... *G06V 20/188* (2022.01); *G06T 7/0012* (2013.01); *G06T 2207/10044* (2013.01); *G06T 2207/30188* (2013.01)

(58) Field of Classification Search
CPC .. G06V 20/188; G06V 10/776; G06V 10/803; G06T 7/0012; G06T 2207/10044; G06T 2207/30188; G06K 9/6289
See application file for complete search history.

(56) References Cited

U.S. PATENT DOCUMENTS

2019/0050948 A1* 2/2019 Perry ................... G06V 20/188
2019/0179009 A1* 6/2019 Klein ................... G01S 13/9023

OTHER PUBLICATIONS

A. Sinha et al., "Applying a particle filtering technique for canola crop growth stage estimation in Canada", Proc. SPIE 10421, Remote Sensing for Agriculture, Ecosystems, and Hydrology XIX, 104211F, 2017.

(Continued)

*Primary Examiner* — Siamak Harandi
(74) *Attorney, Agent, or Firm* — Barnes & Thornburg LLP; Steven D. Shipe

(57) ABSTRACT

Techniques for estimating crop maturity using remote sensing imagery are disclosed. A method may include a step of providing a remote sensing image of crops acquired at an image acquisition time, for example, a synthetic aperture radar image acquired from a satellite. The method may also include a step of predicting a maturity level of the crops at the image acquisition time based on input crop maturity data from an input time and weather-based growth indication data from between the input time and the image acquisition time. The weather-based growth indication data may include growing degree day data. The method may further include a step of updating the predicted maturity level to an updated maturity level of the crops based on the remote sensing image and a response model relating remote sensing image information to crop maturity information. The predicting and updating steps may involve performing a particle filtering operation.

37 Claims, 10 Drawing Sheets

(56) References Cited

OTHER PUBLICATIONS

H. McNaim et al., "Estimating canola phenology using synthetic aperture radar", Remote Sensing of Environment, vol. 219, pp. 196-205, 2018.
J. M. Lopez-Sanchez et al., "Rice phenology monitoring by means of SAR polarimetry at X-band", IEEE Transactions on Geoscience and Remote Sensing, vol. 50, No. 7, pp. 2695-2709, 2012.
F. Vicente-Guijalba et al., "Crop phenology estimation using a multitemporal model and a Kalman filtering strategy", IEEE Geoscience Remote Sensing Letters, vol. 11, No. 6, pp. 1081-1085, 2014.
C. G. De Bernardis et al., "Estimation of Key Dates and Stages in Rice Crops Using Dual-Polarization SAR Time Series and a Particle Filtering Approach", IEEE Journal of Selected Topics in Applied Earth Observations and Remote Sensing, vol. 8, No. 3, 2015.
A. Moreira et al., "A tutorial on synthetic aperture radar", IEEE Geoscience and Remote Sensing Magazine, vol. 1(1), pp. 6-43, 2013.

* cited by examiner

CROP PHENOLOGY ESTIMATION AND TRACKING WITH REMOTE SENSING IMAGERY

RELATED PATENT APPLICATION

The present application claims priority to U.S. Provisional Patent Application No. 62/915,071 filed on Oct. 15, 2019, the disclosure of which is incorporated herein by reference in its entirety.

TECHNICAL FIELD

The technical field generally relates to agricultural monitoring, and more particularly, to methods and systems for crop phenology estimation and tracking with remote sensing imagery.

BACKGROUND

Accurate crop growth stage estimation is important in precision agriculture as it facilitates improved crop management, pest and disease mitigation, and resource planning A host of management decisions, including irrigation, fertilization, pesticide application, and harvesting, are linked to crop growth stages, also referred to as phenological states. For example, prolonged periods of wet soil conditions, when present during critical crop development stages, can significantly elevate the risk of some crop diseases. However, tracking crop growth stages can be difficult without on-site observations. In the case of canola, swathing at the optimum stage of ripening reduces green seed problems and seed shatter losses, thus ensuring the quality required for top grades and prices. Canola is an oilseed crop used to produce vegetable oil as well as high-protein animal feed. Global production of canola has grown rapidly over the last 40 years, and canola is now the second-largest oil crop. Disease and insect infestations are of significant concern for canola producers. The risk of infestation is highly dependent upon cropping practices and environmental conditions, and correlates with crop development stages. Therefore, to treat infected fields, spraying should be applied at specific growth stages in order to be effective. Sclerotinia stem rot affects canola when the crop is in bloom with variations in rates of infection due to, among other factors, rainfall, soil moisture, and temperature. Fungicide to counter sclerotinia should be applied when the canola is in bloom. Insect infestations can also devastate crops, with canola most vulnerable at the pod stage. To be effective, insecticides should not be applied prior to pod development. As can be appreciated, knowledge of crop growth status can assist with planning of farm operations. Forecasting harvest times can also assist the sector by providing advance notice for planning the deployment of transport when and where it is needed. Furthermore, information on growth stage, when coupled with information on soil wetness, can be used to determine field specific (for producers) and regional (for the sector) risk of infection.

Monitoring conditions that increase disease risk in canola is challenging given the significant acreages of this crop in production. Optical sensors have been used to identify canola flowering but gaps in data coverage due to cloud interference impede or make difficult the use of visible and infrared Earth observation (EO) sensors for monitoring these rapidly changing conditions. Differences in planting dates, cultivars and soil conditions mean that the timing of flowering and podding among fields of canola varies. Thus, reliable and frequent access to data is desirable to determine time-specific and field-specific growth stages. Remote sensing imagery, notably synthetic aperture radar (SAR) imagery, can provide field-level growth estimates while covering regional scales. Due to its all-weather, day-night, and large-area and high-spatial-resolution coverage characteristics, SAR imagery is of particular interest for monitoring and assessing crop growth. Furthermore, recent advances in SAR modeling, processing, and sensor technology, combined with the availability of SAR data at different frequencies and polarizations, have promoted the use of SAR imagery in agriculture monitoring. SAR response largely depends on the geometrical and dielectric properties of the target. Canopy structure varies as function of crop growth and type, and SAR is sensitive to these variations. For example, fields of canola are readily detected by C-band SAR sensors. As the canola crop grows, biomass accumulates and the canopy structure changes as the plant matures, with significant changes in structure occurring as the canola develops buds, flowers, and forms pods. As growth advances, not only does backscatter increase, but so do the randomness in scattering and the amount of scattering attributable to multiple/volume scattering.

A number of recent studies have reported on the statistical sensitivity of SAR responses to changing growth stage for a wide range of crops (e.g., canola, wheat, rice, barley, oat, corn, and soybean) and on the SAR parameters that are likely to be the most successful at determining growth stages of different crops. However, most of these studies have not developed a methodology to estimate growth stages.

A research team at the University of Alicante has developed a method for rice growth stage estimation, as reported in the following articles, the entire contents of which are incorporated herein by reference: J. M. Lopez-Sanchez et al., "Rice phenology monitoring by means of SAR polarimetry at X-band", *IEEE Transactions on Geoscience and Remote Sensing*, vol. 50, no. 7, pp. 2695-2709, 2012; F. Vicente-Guijalba et al., "Crop phenology estimation using a multitemporal model and a Kalman filtering strategy", *IEEE Geoscience Remote Sensing Letters*, vol. 11, no. 6, pp. 1081-1085, 2014; and C. G. De Bernardis et al., "Estimation of Key Dates and Stages in Rice Crops Using Dual-Polarization SAR Time Series and a Particle Filtering Approach", *IEEE Journal of Selected Topics In Applied Earth Observations and Remote Sensing*, vol. 8, no. 3, 2015. The method uses recursive filtering, notably particle filtering. Recursive filtering uses all past information to estimate a parameter of interest, in this case the growth stage. However, this technique has a number of drawbacks and limitations. First, the use of SAR polarimetric parameters (or a linear combination of them) as state variables limits the capability of the particle filtering procedure. In principle, more parameters should provide better growth stage estimates. However, the number of particles, which is a linear function of the complexity of particle filtering procedure, increases exponentially as the dimension of the state variables (or SAR polarimetric parameters) increases. Second, the use of principal component analysis (PCA) to reduce the dimension of state variables may not be an effective selection as the relationships between SAR polarimetric parameters are nonlinear. Third, the crop growth stages are not directly estimated. Rather, they are obtained by projection of estimated SAR polarimetric parameters over a dynamic model. This step can increase the errors in estimated growth stages. Fourth, the procedure is applied to a single mode of the satellite TerraSAR-X and cannot be directly extended to the fusion of multiple sensors and/or modes, which is often required for temporally dense coverage and for exploiting complementary features of different sources of EO data.

SUMMARY

The present description generally relates to techniques for crop growth monitoring using remote sensing imagery.

In accordance with an aspect, there is provided a method of estimating crop maturity using remote sensing imagery, the method including:
- providing a remote sensing image of crops acquired at an image acquisition time;
- predicting a maturity level of the crops at the image acquisition time based on input crop maturity data from an input time and weather-based growth indication data from between the input time and the image acquisition time; and
- updating the predicted maturity level to an updated maturity level based on the remote sensing image and a response model relating remote sensing image information to crop maturity information.

In some embodiments, the step of providing the remote sensing image may include a step of acquiring the remote sensing image with a remote sensing imager.

In some embodiments, the providing, predicting, and updating steps of the method may be performed sequentially and iteratively, for N iterations, N being an integer greater than one, and the updated maturity level at the image acquisition time from the $n^{th}$ iteration may be used in providing the input crop maturity data at the input time for the $(n+1)^{th}$ iteration, n ranging from 1 to N−1. In such embodiments, the method may include providing the input crop maturity data for the first iteration based on a distribution of crop planting dates that defines the input time for the first iteration.

In some embodiments, the predicted maturity level of the crops may include a predicted probability distribution of the crop maturity at the image acquisition time, and the updated maturity level may include an updated probability distribution of the crop maturity at the image acquisition time expressing a likelihood of a match with the remote sensing image in the response model.

In some embodiments, the predicting and updating steps may be implemented using recursive filtering, for example, by performing a particle filtering operation. The particle filtering operation may include: generating, as the predicted maturity level, a set of particles representing a probability density function of a state variable indicative of the crop maturity at the image acquisition time, each particle in the set of particles having a state value and a weight based on the input crop maturity data and the weather-based growth indication data; and determining the updated maturity level by adjusting the weights of the particles based on a likelihood function by using the remote sensing image in the response model. The particle filtering operation may also include a resampling of the particles based on the updated weights.

In some embodiments, the remote sensing image may include a synthetic aperture radar (SAR) image, an electro-optical image, or a combination thereof. In some embodiments, the SAR image may include a polarimetric SAR image. In such a case, the remoting sensing image information related to crop maturity information in the response model may include one or more SAR polarimetric parameters.

In some embodiments, the weather-based growth indication data may include heat accumulation data accumulated between the input time and the acquisition time. The heat accumulated data may include growing degree days (GDD) data. In such a case, the method may include a step of converting the updated maturity level of the crops to a BBCH code by relating the updated maturity level to a ratio of a number of GDDs associated with the crops for reaching a particular BBCH code to a number of GDDs associated with a lifetime of the crops.

In some embodiments, the method may include a step of predicting a subsequent maturity level of the crops at a subsequent time after the image acquisition time based on the updated maturity level and weather-based growth indication data from between the image acquisition time and the subsequent time. In some embodiments, the method may include a step of predicting a past maturity level of the crops at a past time before the image acquisition time based on the updated maturity level and past data. The past data may include weather-based growth indication data from between the past time and the image acquisition time, or remote sensing image data acquired between the past time and the image acquisition time, or a combination thereof.

In some embodiments, the method may include a step of adjusting the updated maturity level based on another remote sensing image acquired at a different time, either before or after the image acquisition time of the remote sensing image. In some embodiments, the method may include predicting a value of the crop maturity corresponding to a certain time in the past, or a time in the past corresponding to a certain crop growth stage, based on weather-based growth indication data and remote sensing imagery data acquired prior to and after the certain time in the past or the certain past crop growth stage. In some embodiments, the method may include a step of predicting, based on the updated maturity level, a time at which the crops have reached or will reach a specified crop growth stage. In some embodiments, the input time is before the image acquisition. In other embodiment, the input time is after the image acquisition time.

In accordance with another aspect, there is provided a non-transitory computer readable storage medium having stored thereon computer executable instructions that, when executed by a processor, cause the processor to perform a method including:
- receiving a remote sensing image of crops acquired at an image acquisition time;
- predicting a maturity level of the crops at the image acquisition time based on input crop maturity data from an input time and weather-based growth indication data from between the input time and the image acquisition time; and
- updating the predicted maturity level to an updated maturity level based on the remote sensing image and a response model relating remote sensing image information to crop maturity information.

In some embodiments, the providing, predicting, and updating steps may be performed sequentially and iteratively, for N iterations, N being an integer greater than one, and the updated maturity level at the image acquisition time from the $n^{th}$ iteration is used in providing the input crop maturity data at the input time for the $(n+1)^{th}$ iteration, n ranging from 1 to N−1. In such embodiments, the method may include providing the input crop maturity data for the first iteration based on a distribution of crop planting dates defining the input time for the first iteration.

In some embodiments, the predicting and updating steps may include performing a particle filtering operation. The particle filtering operation may include: generating, as the predicted maturity level, a set of particles representing a probability density function of a state variable indicative of the crop maturity at the image acquisition time, each particle in the set of particles having a state value and a weight based on the input crop maturity data and the weather-based growth indication data; and determining the updated maturity level by adjusting the weights of the particles based on a likelihood function by using the remote sensing image in the response model. The particle filtering operation may also include a resampling of the particles based on the updated weights.

In some embodiments, the remote sensing image may include a synthetic aperture radar (SAR) image, an electro-optical image, or a combination thereof.

In some embodiments, the weather-based growth indication data may include GDD data accumulated between the input time and the acquisition time.

In some embodiments, the method may include predicting a subsequent maturity level of the crops at a subsequent time after the image acquisition time based on the updated maturity level and weather-based growth indication data from between the image acquisition time and the subsequent time. In some embodiments, the method may include a step of predicting a past maturity level of the crops at a past time before the image acquisition time based on the updated maturity level and past data. The past data may include weather-based growth indication data from between the past time and the image acquisition time, or remote sensing image data acquired between the past time and the image acquisition time, or a combination thereof.

In some embodiments, the input time is before the image acquisition. In other embodiment, the input time is after the image acquisition time.

In accordance with another aspect, there is provided a computer device including a processor and a non-transitory computer readable storage medium such as described herein, wherein the non-transitory computer readable storage medium is operatively coupled to the processor and has stored thereon computer readable instructions that, when executed by a processor, cause the processor to perform various steps of methods described herein.

In accordance with another aspect, there is provided a system for estimating crop maturity using remote sensing imagery, the system including a remote sensing imager configured for acquiring a remote sensing image of crops at an image acquisition time; and a control and processing unit operatively coupled to the remote sensing imager. The control and processing unit may be configured for: receiving the remote sensing image from the remote sensing imager; predicting a maturity level of the crops at the image acquisition time based on input crop maturity data from an input time and weather-based growth indication data from between the input time and the image acquisition time; and; updating the predicted maturity level to an updated maturity level based on the remote sensing image and a response model relating remote sensing image information to crop maturity information.

In accordance with another aspect, there is provided a method of estimating crop maturity using remote sensing imagery, the method including:
providing a response model relating remote sensing image information to crop maturity information;
providing an input maturity estimate of crops corresponding to an input time;
providing a remote sensing image of the crops acquired at an image acquisition time;
predicting a maturity level of the crops corresponding to the image acquisition time based on the input maturity estimate and weather-based growth indication data accumulated between the input time and the image acquisition time; and
updating the predicted maturity level based on the remote sensing image and the response model.

In some embodiments, the step of predicting the maturity level corresponding to the image acquisition time includes generating a set of particles representing a probability density function of a state variable representing the maturity level at the image acquisition time, the step including, for each particle of the set of particles: generating a state value for the particle at the image acquisition time based on the weather-based growth indication data accumulated between the input time and the image acquisition time; and generating a weight for the particle based on the initial estimate of the crop maturity corresponding to the input time. In some embodiments, the step of updating the predicted maturity level at the image acquisition time includes, for each particle of the set of particles, updating the weight of the particle based on a likelihood of a match, based on the response model, between the state value of the particle and the remote sensing image based on the response model.

In some embodiments, there is provided a recursive filtering method for estimating crop growth stages by fusing multi-sensor and multi-mode remote sensing data. The method may use particle filtering, with a crop maturity level as state variable, with values ranging between 0 and 1, which may help avoiding dimensionality issues. Crop growth stages may be directly estimated or predicted from the crop maturity levels, with no model-based projection. In applications using SAR polarimetry, computation cost increases only linearly with the number of polarimetric parameters used. In some cases, different sets of SAR parameters, from different satellite sensors and their beam modes, may be used to update maturity level estimates at different times. Thus, the recursive filter may fuse SAR data from multiple satellites by updating the growth stage estimates using each sensor data as soon as it becomes available. The method may deliver continuous and timely updates of growth stage during crop growing season. The maximal information coefficient, which computes normalized mutual information between two variables, may be used to compute dependency between polarimetric parameters. For computing dependency between polarimetric parameters, the maximal information coefficient is used, which computes normalized mutual information between two variables, is used. In some cases, the recursive filtering method includes an initialization step, a prediction step, and an updating step. During the initialization step, a uniform particle density, representing maturity levels, may be sampled depending on a planting date distribution of the crop under consideration. The prediction step is triggered by the acquisition of a new remote sensing image. At this step, a proposed density may be determined from the current particles to transform in accordance with the remote sensing image. The proposed density may be determined in accordance with a transition model relying on weather-based growth indicators (e.g., growing degree days) accumulated between the previous and current remote sensing image acquisition times. The transition model may also add independent zero-mean Gaussian noises to the particles with standard deviation proportional to the data interval. During the updating step, the likelihood of the particles may be computed using a crop-specific feature response model relating crop maturity to remote sensing imagery features. The model may be built using training remote sensing imagery data and crop maturity ground truth data (e.g., obtained from previous growing seasons). The particles may be resampled based on their likelihood and the resampled particles may provide an estimated maturity level distribution at the current time. The prediction and updating steps may be repeated each time a new remote sensing image becomes available. Thus, the current crop growth stage may be estimated from the maturity level and future growth stages may be predicted. In some cases, the recursive filtering procedure may not be based on particle filtering. For example, in some applications, Kalman filtering, a low-computational complexity recursive filter that assumes linear-Gaussian dynamic system, as well as nonlinear and/or non-Gaussian implementations of recursive filtering (e.g., extended-Kalman filter and unscented Kalman filter) may also or instead be used.

It is appreciated that other method and process steps may be performed prior to, during or after the steps described herein. The order of one or more steps may also differ, and some of the steps may be omitted, repeated, and/or combined, depending on the application. It is also appreciated that some method steps can be performed using various image processing techniques, which can be implemented in hardware, software, firmware, or any combination thereof.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

BRIEF DESCRIPTION OF THE DRAWINGS

FIG. 5B: Rosthern, Saskatchewan; FIG. 5C: Red Deer, Alberta).

FIG. 6B: Rosthern, Saskatchewan; FIG. 6C: Red Deer, Alberta).

DETAILED DESCRIPTION

Figure 1:
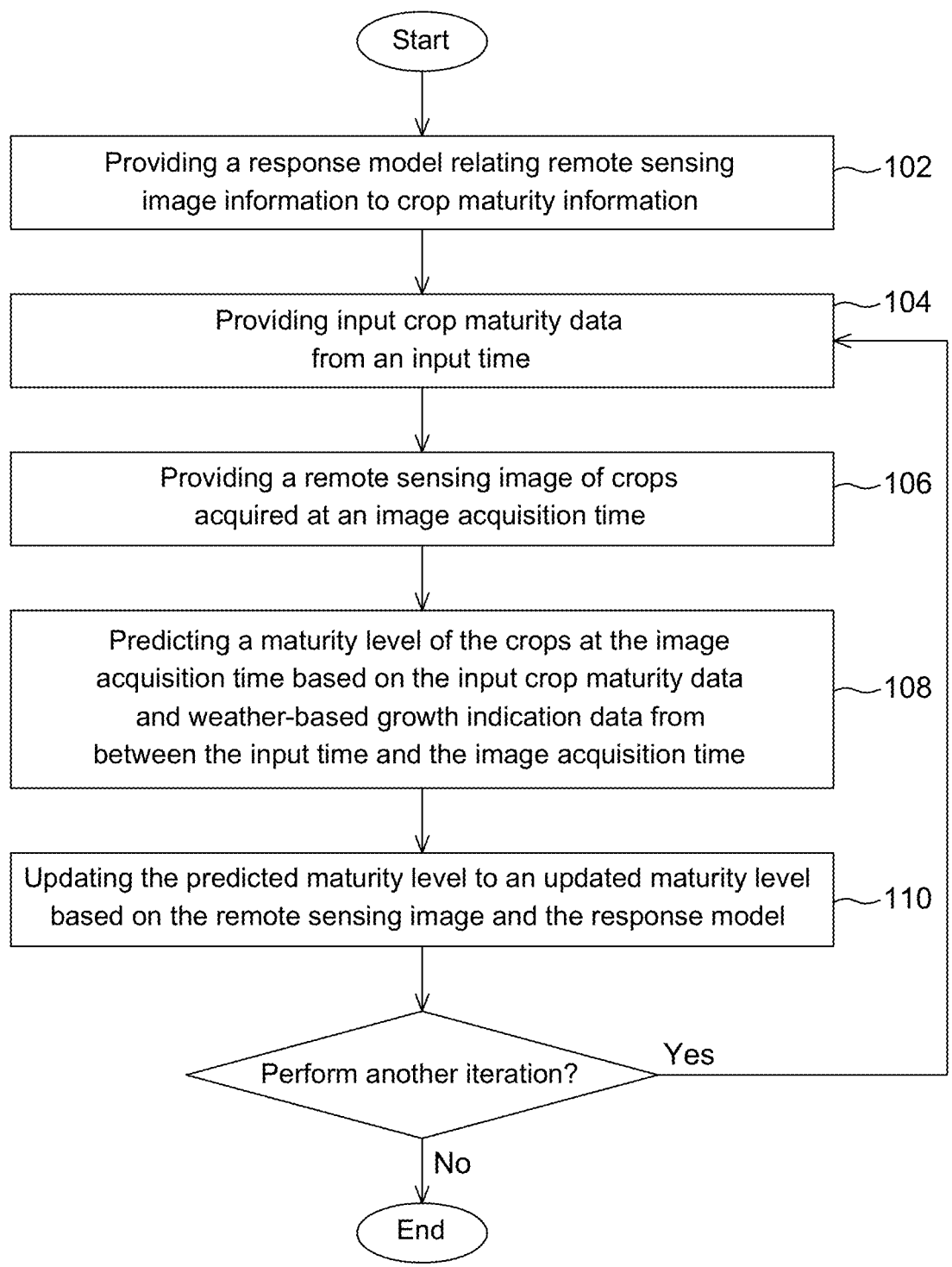
FIG. 1 is a flow diagram of a method of estimating crop maturity using remote sensing imagery, in accordance with an embodiment.

In the present description, similar features in the drawings have been given similar reference numerals. To avoid cluttering certain figures, some elements may not be indicated if they were already identified in a preceding figure. It should also be understood that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It is appreciated that such spatially relative terms are intended to encompass different orientations in the use or operation of the present embodiments, in addition to the orientations exemplified in the figures.

The terms "a", "an", and "one" are defined herein to mean "at least one", that is, these terms do not exclude a plural number of elements, unless stated otherwise.

Terms such as "substantially", "generally", and "about", which modify a value, condition, or characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" generally refers to a range of numbers that one skilled in the art would consider equivalent to the stated value (e.g., having the same or an equivalent function or result). In some instances, the term "about" means a variation of ±10% of the stated value. It is noted that all numeric values used herein are assumed to be modified by the term "about", unless stated otherwise.

The term "between" as used herein to refer to a range of numbers or values defined by endpoints is intended to include both endpoints, unless stated otherwise. For example, a time range defined between a first time and a second time includes both the first time and the second time.

The term "based on" as used herein is intended to mean "based at least in part on", whether directly or indirectly, and to encompass both "based solely on" and "based partly on". In particular, the term "based on" could also be understood as meaning "depending on", "representative of", "indicative of", "associated with", and the like.

The terms "match", "matching", and "matched" refer herein to a condition in which two elements are either the same or within some predetermined tolerance of each other. That is, these terms are meant to encompass not only "exactly" or "identically" matching the two elements but also "substantially", "approximately", or "subjectively" matching the two elements, as well as providing a higher or best match among a plurality of matching possibilities.

The terms "connected" and "coupled", and derivatives and variants thereof, refer herein to any connection or coupling, either direct or indirect, between two or more elements, unless stated otherwise. For example, the connection or coupling between the elements may be mechanical, optical, electrical, magnetic, thermal, chemical, logical, fluidic, operational, or any combination thereof.

The term "time", when referring herein to the occurrence of an event, is meant to include both a point in time and time range. The term "concurrently" refers herein to two or more processes that occur during coincident or overlapping time periods. The term "concurrently" does not necessarily imply complete synchronicity and encompasses various scenarios including: time-coincident or simultaneous occurrence of two processes; occurrence of a first process that both begins and ends during the duration of a second process; and occurrence of a first process that begins during the duration of a second process, but ends after the completion of the second process.

The term "providing" is used broadly and refers herein to, but is not limited to, making available for use, acquiring, obtaining, accessing, supplying, receiving, assigning, and retrieving. By way of example, in some implementations, the provision of a remote sensing image can involve the act of directly acquiring the remote sensing image using an imaging system and making available for use the image data thus acquired. However, in other implementations, the provision of the remote sensing image can involve the act of retrieving or receiving previously acquired image data, for example, from a database, a virtual library, or a storage medium.

The terms "light" and "optical", and variants and derivatives thereof, refer herein to radiation in any appropriate region of the electromagnetic spectrum. These terms are not limited to visible light but can also include invisible regions of the electromagnetic spectrum including, without limitation, radio, microwave (MW), terahertz (THz), infrared (IR), and ultraviolet (UV) spectral bands.

The present description generally relates to techniques for crop growth monitoring using remote sensing imagery. The disclosed techniques may be used or implemented in various fields of applications and industries that may require or benefit from systems and methods with crop growth estimation and tracking capabilities, for example, to improve crop, water, and fertilizer management; assess crop disease risk; assist in land use and resource planning; or otherwise support farming activities.

In the present description, terms such as "estimate" and "predict" can mean approximate, measure, project, infer, deduce, derive, or any suitable manner of estimating or predicting a value or values. Depending on the application, an estimated or predicted value can be a past value, a present value, or a future value. It is appreciated that the present techniques may be used to estimate or predict crop maturity levels or crop growth stages not only in the present and the future, but also in the past. In particular, in some implementations, the disclosed techniques may be used to retrodict or backward predict crop development information about the past, for example, by estimating the time of occurrence of past crop growth states, such as planting or flowering, or the crop maturity corresponding to a particular time in the past.

The term "crop" generally refers herein to any plant grown to be harvested or used for any economic purpose, including agriculture crops, aquaculture crops, horticulture crops, floriculture crops, and industrial crops. Non-limiting examples of crops include crops intended for human or animal consumption (e.g., human food and livestock fodder), for use as clothing (e.g., fiber crops), for use as biofuel (e.g., energy crops, algae fuel), for use in medicine, and for use as decorative, ornamental, or recreational plants. Non-limiting examples of crops intended for human or animal consumption include grain crops such as cereals (e.g., maize, rice, barley, oat, wheat, millet, sorghum, rye) and legumes (e.g., beans, peas, lentils, soybeans), forage crops, fruits and vegetables, tree nuts, and oil, fat and wax crops (e.g., oilseed crops such as canola, sunflower, coconut, palm, rapeseed, peanuts).

In the present description, the term "crop growth", and variants and derivatives thereof, generally refer to an increase in crop size, volume, weight, height, or area over a certain time period. Furthermore, the terms "crop phenology", "crop development", "crop maturity", and variants and derivatives thereof, are used broadly to refer to the progress or timing of a crop going from one growth stage to the next. Crop phenological growth stages can be qualitatively or quantitatively measured using various models or scales. Non-limiting examples of crop growth staging scales include, to name a few, the BBCH scale, the Feekes scale, the Zadoks scale, and the Haun scale. It is appreciated that the general principles underlying the principles, operations, and applications of crop growth staging scales are known in the art and need not be described in greater detail herein.

The term "weather-based growth indicator", and variants and derivatives thereof, refers herein to a parameter, factor, index, or unit established based on past, current, and/or forecast weather data to assess or predict crop phenological development. Non-limiting examples of possible weather-based growth indicators include heat-based indicators such as growing degree day, modified growing degree day, crop heat unit, photothermal unit, heliothermal unit, hygrothermal unit, photothermal time, photothermal index, heat-use efficiency, relative temperature disparity, and any combination thereof. This list is not exhaustive and various other weather-based growth indicators may be used to implement the present techniques, as can be appreciated by a person having ordinary skill in the art. It is also appreciated that depending on the application, crop phenology and growth may be assessed more accurately and reliably by considering the effects of weather-based growth indicators, rather than calendar days. The term "growing degree day" and its acronym "GDD" refer herein to a weather-based indicator that provides a measure of heat accumulation to assess and predict crop development. GDDs can be calculated as the difference between the average of the daily maximum and minimum temperatures and a predetermined base temperature.

The term "remote sensing imagery" is intended to refer herein to a variety of active and passive remote sensing imaging technologies. The term "remote sensing" is often but not exclusively used to refer to spaceborne and airborne sensing technologies that rely on signal propagation (e.g., electromagnetic radiation) to monitor, track, or otherwise detect objects on Earth. Non-limiting examples of remote sensing imaging techniques that may be used to implement the present techniques include, to name a few, synthetic aperture (SA) imaging, such as SA radar (SAR), SA lidar (SAL), SA terahertz imaging, SA infrared imaging, and SA sonar (SAS) imaging; electro-optical imaging operating in the infrared, the visible, or the ultraviolet; lidar and other laser-based scanning sensor technologies, such as Raman remote sensing, which may employ various range measurement methods, including time-of-flight (TOF), phase-shift, and frequency modulation methods; passive optical and thermal remote sensing; multispectral and hyperspectral imagery; passive and active sonar; RFID remote sensing; and the like. Depending on the applications, remote sensing images may be still and/or video images, and may include both film and digital imagery.

SAR is a form of radar technique that can be used to increase resolution beyond the diffraction limit of a physical aperture of an imaging system. In SAR, a large virtual aperture is synthesized by illuminating a target region (e.g., crop fields) with electromagnetic signals transmitted from a moving platform, and by collecting phase-coherent return echoes produced by reflection of the electromagnetic signals from the target region. The amplitude and phase of the return echoes depend on the physical (e.g., geometry, roughness) and electrical (e.g., permittivity) properties of the target region. The return echoes are recorded and coherently combined to reconstruct a high-resolution 2D or 3D image of the target region. The reconstructed image is generally independent of solar illumination, cloud coverage, and weather conditions. In some applications, 4D mapping (space and time) is also possible. SAR systems typically include a transmitter-receiver unit mounted on a manned or unmanned airborne, spaceborne, or terrestrial platform, such as an aircraft (e.g., an unmanned aerial vehicle), a spacecraft, or a satellite. The platform travels along a path over a target region to be imaged. The transmitter-receiver unit directs a plurality of radar signals onto the target region and collects a series of phase-coherent return echoes corresponding to the radar signals reflected by the target region. SAR systems typically also include a control and processing unit to create SAR images from the recorded echoes using various signal processing techniques.

Depending on the application, SAR can provide control over various parameters including, but not limited to, intensity, incident angle, spatial resolution, frequency, phase, polarization, swatch width, squint angle, and the like. Furthermore, SAR can use various operations modes (e.g., stripmap, scanning, spotlight) and techniques (e.g., polarimetry, interferometry, differential interferometry, polarimetric SAR interferometry, tomography). In particular, SAR polarimetry is widely used for obtaining qualitative and quantitative information on geophysical and biophysical parameters from the Earth's surface, in applications such as agriculture (e.g., crop identification and growth monitoring), forestry, hydrology, and security. SAR polarimetry uses a 2×2 scattering matrix expressed in terms of four complex scattering coefficients to describe the scattering properties of objects after an interaction with electromagnetic waves. A review of recent literature on the use of SAR remote sensing for agriculture can be found in the following articles, the entire contents of which are incorporated herein by reference: A. Sinha et al., "Applying a particle filtering technique for canola crop growth stage estimation in Canada", *Proc. SPIE* 10421, *Remote Sensing for Agriculture, Ecosystems, and Hydrology XIX,* 104211F, 2017; and H. McNairn et al., "Estimating canola phenology using synthetic aperture radar", *Remote Sensing of Environment,* vol. 219, pp. 196-205, 2018. It is appreciated that the general principles underlying the principles, operations, and applications of SAR are known in the art and need not be described in greater detail herein. Reference is made in this regard to the following article, the entire contents of which are incorporated herein by reference: A. Moreira et al., "A tutorial on synthetic SAR aperture radar", *IEEE Geoscience and Remote Sensing Magazine,* vol. 1(1), pp. 6-43, 2013. It is to be noted that while disclosed embodiments are implemented in or with SAR systems operating at wavelengths in the microwave portion of the electromagnetic spectrum (e.g., P, L, C, X, $K_u$, and $K_a$ bands), the present techniques may also be employed in other types of SA imaging modalities operating in other wavelength ranges, non-limiting examples of which are mentioned above.

The term "electro-optical imaging" refers herein to imaging techniques that use conversion of electromagnetic radiation at optical wavelengths to electrical signals. The term "optical radiation" refers herein to electromagnetic radiation of wavelengths ranging from about 10 nanometers to about 1 millimeter, encompassing the ultraviolet, the visible, and the infrared regions of the electromagnetic spectrum.

Referring to FIG. 1, there is provided a flow diagram of an embodiment of a method 100 of estimating crop maturity using remote sensing imagery, for example, SAR imagery and/or electro-optical imagery. Broadly described, the method 100 depicted in FIG. 1 generally includes steps of providing 102 a response model relating remote sensing image information to crop maturity information; providing 104 input crop maturity data from an input time; providing 106 a remote sensing image of crops acquired at an image acquisition time; predicting 108 a maturity level of the crops at the image acquisition time based on input crop maturity data from an input time and weather-based growth indication data from between the input time and the image acquisition time; and updating 110 the predicted maturity level to an updated maturity level based on the remote sensing image and a response model relating remote sensing image information to crop maturity information. Depending on the application, the input time may be either before or after the image acquisition time, and each of the input time and the image acquisition may correspond to a point in time or a period of time. In FIG. 1, steps 104, 106, 108, and 110 of the method 100 are performed iteratively, for N iterations, where N is an integer greater than one. In some embodiments, the number N of iterations may be predetermined. In other embodiments, an iteration of the method 100 may be performed every time a new remote sensing image is acquired or otherwise available during a certain period of time. However, it is appreciated that in other embodiments of the method 100, steps 104, 106, 108, and 110 may be performed only once. The operation of these steps and other possible steps of the method 100 are described in greater detail below.

The method 100 includes a step 102 of providing a response model relating remote sensing image information to crop maturity information. Depending on the application, the response model may be obtained from experimental data, analytical calculations, numerical calculations, or any combination thereof. For example, in one embodiment, the response model may be obtained by acquiring a set of remote sensing images, using one or more imaging modalities, and a set of crop maturity observations or measurements of the crop area (or representative of the crop area) at different times during one or more crop-growing seasons. Obtaining the response model may also include identifying parameters in the remote sensing images that vary appreciably with crop maturity, and determining or characterizing a relationship, for example, a statistical relationship, between the identified image parameters and crop maturity.

The method 100 also includes a step 104 of providing input crop maturity data from an input time. The input crop maturity data may provide an estimate of the maturity level of the crops at the input time. In FIG. 1, steps 104, 106, 108, and 110 are performed iteratively, such that the updated maturity level obtained at the updating step 110 of the $n^{th}$ iteration provides, at least in part, the input crop maturity data at the providing step 104 of the $(n+1)^{th}$ iteration, where n ranges from 1 to N−1. For the first iteration, the input crop maturity data may be established based on a distribution of crop planting dates, where the distribution of crop planting dates defines the input time for the first iteration. For example, the input crop maturity data for the first iteration, which may be referred to as the initial crop maturity data, may be determined based on a distribution of input times corresponding to a probability density function (PDF) of planting dates related to the specific crops and the specific crop-growing region under consideration. In such a case, each planting date in the distribution may conveniently correspond to a maturity of zero. The PDF of planting dates may be determined based on input information found in the literature and/or on information associated with previous growing seasons. The initial crop maturity data may also be crop-season-specific. For example, the planting date distribution may be determined based on GDD information from the beginning of a year or from another time, and/or based on one or more other criteria. Depending on the application, the distribution of planting dates can be parametric or a nonparametric (e.g., defined by samples).

The method 100 further includes a step 106 of acquiring, receiving or otherwise providing a remote sensing image of the crops acquired at an image acquisition time. In some embodiments, the remote sensing image may include one or more SAR images and/or one or more electro-optical images.

The method 100 also includes a step 108 of predicting a maturity level of the crops at the image acquisition time based on the input crop maturity data from the input time and weather-based growth indication data from between the input time and the image acquisition time. The weather-based growth indication data may be a measure of heat accumulation, for example, based on growing degree days (GDDs) and/or other heat-based indicators such as those provided above. The prediction step 108 serves to convert the input maturity estimate (e.g., the planting date distribution for the first iteration or the previous updated maturity level for subsequent iterations) to a predicted maturity level at the image acquisition time. It is appreciated that the prediction step 108 may use a variety of transition models that compute parametric and/or nonparametric distribution of crop phenology using heat units (e.g., GDD) accumulated between the initial time and the image acquisition time. See, for example, the transition state equation given in Eq. (6) below, which defines a crop maturity index ranging between 0 and 1 in terms of GDD values. In some implementations, appropriate process noise statistics, which model the uncertainty in the GDD-based prediction process, may be incorporated into the model for the state transition equation prior to performing recursive filtering. The model may be developed using, for example, collected BBCH and GDD data from one or more previous growing seasons.

The predicted crop maturity level may correspond to a predicted PDF of the crop maturity at the image acquisition time. Depending on the application, the predicted PDF can be parametric or nonparametric (e.g., defined by samples). In the nonparametric case, the prediction step 108 may include generating a set of particles or samples representing a PDF of a state variable [e.g., ranging between 0 and 1, see Eq. (6) below] representing the crop maturity at the image acquisition time. Generating the set of particles may include a step of assigning, to each particle, a state value and a weight corresponding to the image acquisition time based on the input crop maturity data and the weather-based growth indication data accumulated between the input time and the image acquisition time.

In some implementations, the method 100 may provide an estimate of the uncertainty or degree of confidence in the predicted crop maturity level. For example, the uncertainty may be assessed from the predicted PDF of crop maturity (parametric or nonparametric). The uncertainty in crop maturity on a particular day may be used to provide a bound on the dates at which a particular growth stage will be or was reached.

Referring still to FIG. 1, the method further includes a step 110 of updating the predicted maturity level to an updated maturity level based on the remote sensing image and the response model. In some implementations, the updated maturity level may correspond to a parametric or nonparametric updated PDF of the crop maturity at the image acquisition time expressing a likelihood of a match with the remote sensing image in the response model. In implementations where a particle filtering operation is performed to obtain the predicted maturity level of the crops, the updating step 110 may include, for each particle of the set of particles generated at the prediction step 108, a step of updating the weight of the particle based on a likelihood function by using the remote sensing image in the response model. The likelihood function may be used to find a match in the response mode between the state value of each particle and the remote sensing image. For example, the updating step 110 may include, for each particle, a step of determining from the response model a distribution of image parameters corresponding to the predicted maturity level obtained at step 108 for the particle. Then, a weight may be assigned to each particle to express a likelihood that the particle corresponds to the actual crop maturity in view of the remote sensing image acquired at the image acquisition time, the response model, and any measurement noise associated with the response model. Once a weight has been assigned to each particle, the particles may be resampled or redrawn according to their weights to represent the updated maturity level as a PDF with equally weighted particles.

In the case of a predicted maturity level expressed as a parametric PDF, the updating step 110 may include inferring crop maturity statistics (e.g., mean, standard deviation) from parameters of the remote sensing image and error statistics from the response model. This information may be independent from the predicted crop statistics obtained at step 108. Then, the predicted crop statistics obtained at step 108 and the crop maturity statistics inferred from the response model and the remote sensing image at step 110 may be combined following a combination procedure for independent information appropriate for the class of parametric distribution, thereby obtaining an updated parametric crop maturity distribution at the image acquisition time.

As noted above, the image acquisition time may be after or before the input time. In embodiments where the image acquisition time is after the input time, predicting the maturity level of the crops at the image acquisition time may involve adding to the input crop maturity data the effect of weather-based growth indication data (e.g., GDD data) accumulated from the input time up to the image acquisition time. In such embodiments, the image acquisition time can be the current time or a time in the past. In embodiments where the image acquisition time is before the input time, predicting the maturity level of the crops at the image acquisition time may involve removing from the input crop maturity data the effect of weather-based growth indication data (e.g., GDD data) accumulated from the image acquisition time up to the input time. In such embodiments, the input time can be the current time, a time in the past, or a time in the future.

In some implementations, the method 100 may include a step of predicting a subsequent maturity level of the crops at a subsequent time after the image acquisition time. The prediction may be made based on the updated maturity level and weather-based growth indication data (e.g., GDD data) from between the image acquisition time and the subsequent time. Depending on whether the subsequent time is in the past, the present, of the future, the weather-based growth indication from between the image acquisition time may include past, current, and/or forecast weather data. In some implementations, the method 100 may include a step of predicting a past maturity level of the crops at a past time before the image acquisition time. In some cases, the past time may be the input time, if the input time is before the image acquisition time. The prediction may be made based on the updated maturity level and past data. The past data may include weather-based growth indication data from between the past time and the image acquisition time, or remote sensing image data acquired between the past time and the image acquisition time, or a combination thereof, or any information derived therefrom. In implementations where steps 104, 106, 108 and 110 are performed iteratively, the prediction of the past maturity level can be made based on one, some, or all of the updated maturity levels obtained between the past time and the latest image acquisition time.

In some implementations, the method 100 may include a step of converting the updated maturity level of the crops to a BBCH code by relating the updated maturity level to a ratio of a number of growing degree days associated with the crops to reaching a particular BBCH code to a number of growing degree days associated with a lifetime of the crops. An example of such a relationship between crop maturity and the BBCH scale is provided in Eq. (6) below. In some implementations, the method 100 may include a step of predicting, based on the updated maturity level, a time at which the crops have reached or will reach a specified crop growth stage or maturity level. In implementations where steps 104, 106, 108 and 110 are performed iteratively, the prediction can be made based on one, some, or all of the updated maturity levels determined from the method 100.

As noted above, in several implementations, maturity or crop growth stage estimates are obtained at the image acquisition time, which is typically after the input time corresponding to the input crop maturity data. The input crop maturity data may combine all past image information which may be relevant to estimating crop maturity at the image acquisition time. In some implementations, a past estimate can be improved or refined using remote sensing image data acquired after the time corresponding to the past estimate. The improvement or refinement of past estimates may be used in a number of applications, for example, those that may require or benefit from an understanding of patterns in planting dates and other growth stage dates. Understanding these patterns may be useful for planning purposes by the industry or the government. The adjustment of past maturity estimates may be performed iteratively starting from the next-to-last image acquisition time. In the following, an exemplary procedure of adjusting past estimates is described. The procedure assumes that both crop growth estimates and the uncertainty in predicting growth stage using GDDs have a Gaussian distribution. A Gaussian distribution of crop growth estimates may be approximated from the particle distribution obtained after the updating step described above at different image acquisition times. An iterative update procedure may be described mathematically as follows. It is assumed that data is available up to time-step N, which is equal to the number of image acquisitions. The term x(k|j) denotes the crop growth stage estimate at time-step k given data up to time-step j, where j can be equal to, less than, or greater than k. Thus, the estimate at time-step k using all data available is denoted by x(k|N). In the iterative procedure x(k|N) is used to estimate x(k−1|N) from x(k−1|k−1), that is, the estimate at time-step k−1 that uses all data up to time-step k−1 obtained by a method such as that depicted in FIG. 1. The variance corresponding to the estimate x(k|j) is denoted by P(k|j). The relationship between x(k−1|N) and x(k−1|k−1) may be written as $$x(k-1\mid N) = x(k-1\mid k-1) + C(k-1)[x(k\mid N) - x(k\mid k-1)], \quad (1)$$

where $$C(k-1) = P(k-1\mid k-1)\frac{F(k-1)}{P(k\mid k-1)}. \quad (2)$$

In the term C(k−1), the factor F(k−1) is a transition factor from time-step k−1 to time-step k, such that $$x(k\mid k-1) = F(k-1)x(k-1\mid k-1), \quad (3)$$

and the variance P(k|k−1) corresponding to x(k|k−1) is given by $$P(k\mid k-1) = F(k-1)P(k-1\mid k-1)F(k-1) + Q(k-1), \quad (4)$$

where Q(k−1) is an added variance term added due to the uncertainty of prediction. The variance of the estimate is given by $$P(k-1\mid N) = P(k-1\mid k-1) + C(k-1)[P(k\mid N) - P(k\mid k-1)]\\C(k-1) \quad (5)$$

In some implementations, remote sensing image data may be made available out of sequence. For example, the image acquisition time corresponding to the latest received remote sensing image may be before the image acquisition time corresponding to the latest updated maturity level. In such a case, the latest updated maturity level may be improved or otherwise adjusted using the latest received remote sensing image. For example, in one embodiment, an out-of-sequence remote sensing image having an image acquisition time corresponding to time-step k may be received after obtaining the latest updated maturity level based on a remote sensing image having an image acquisition time corresponding to time-step k+m, where m is equal to or greater than one. The time-step k−1 corresponds to the image acquisition time of the remote sensing image that was used to obtain the last updated maturity level before time-step k.

A first approach to incorporate the effect of the out-of-sequence image from time-step k into the updated maturity level at time-step k+m is to restart the iterative method described above by (1) using the updated maturity level at time-step k−1 as input crop maturity data along with weather-based growth indication data accumulated between time-step k−1 and time-step k to obtain an adjusted predicted maturity level at time-step k, (2) using the out-of-sequence image from time-step k and the adjusted predicted maturity level to obtain an adjusted updated maturity level at time-step k, and (3) repeating steps (1) and (2) iteratively, from time-step k to time-step k+m, using the previously obtained remote sensing images in order of acquisition time to obtain an adjusted updated maturity level at time-step k+m. This approach involves redoing all the prediction/updating iterations between time-step k and time-step k+m, which itself involves keeping in memory all the remote sensing image data received between two time-steps. This may be a drawback in certain applications.

In a second approach, an equivalent measurement is obtained that can replace the effect of all of the iterative cycles performed after time-step k−1 and before or at time-step k+m, except for the out-of-sequence measurement at time-step k. Using the updated maturity level at time-step k−1 as input crop maturity data along with weather-based growth indication data accumulated between time-step k−1 and time-step k, an adjusted predicted maturity level at time-step k can be obtained, which can be updated using the out-of-sequence image from time-step k to obtain an adjusted updated maturity level at time-step k. Then, the equivalent measurement can be used along with the adjusted updated maturity level at time-step k to perform another crop growth stage update to time-step k+m, resulting in an updated maturity level at time-step k+m. While the second approach may not be as accurate as the first approach, it may be less memory-intensive. This is because the second approach may require previous maturity updates and corresponding error variances to be stored in memory for a limited time, but not previous image data.

Figure 2:
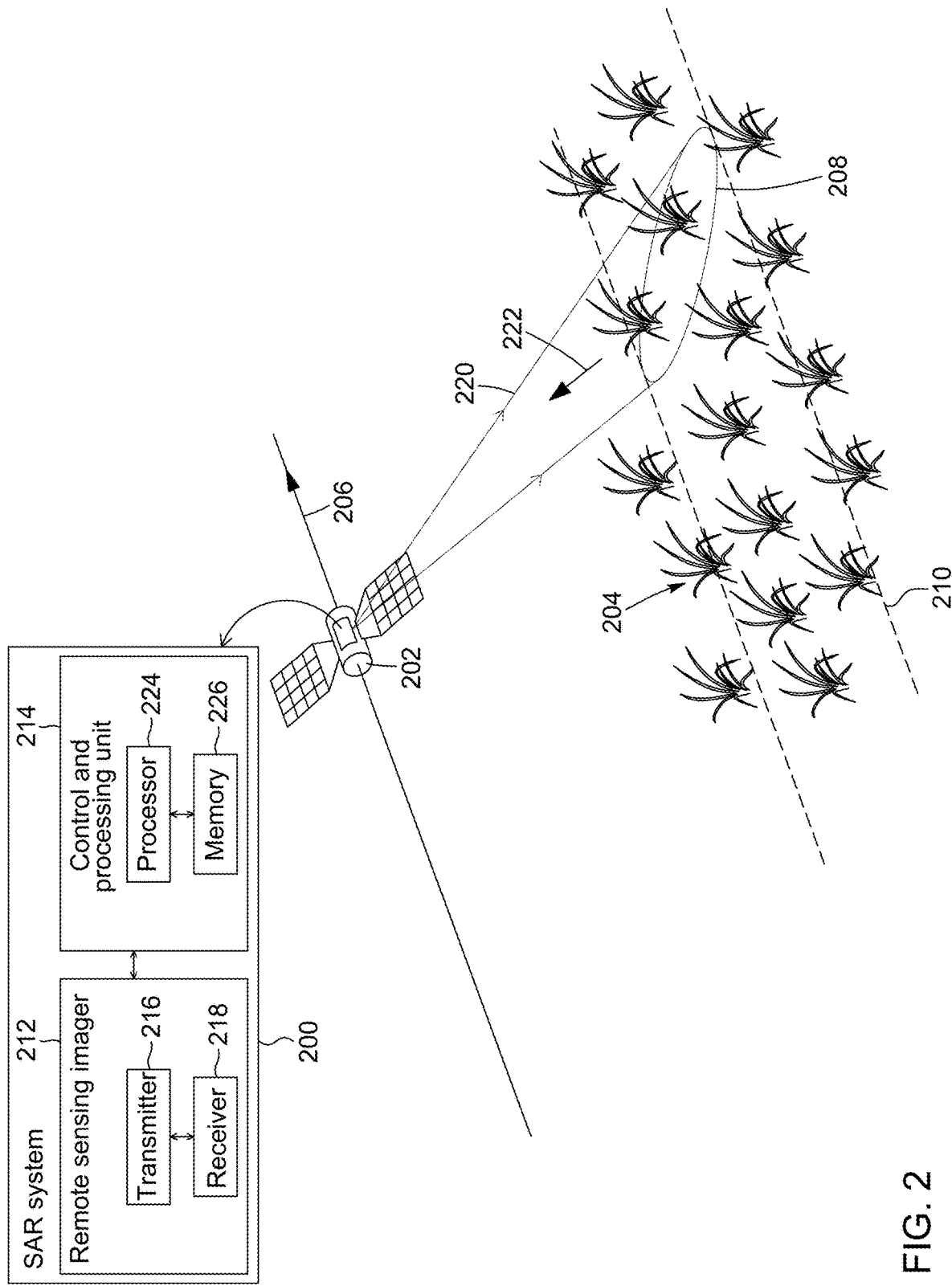
FIG. 2 is a schematic perspective view of a moving platform flying over a scene and on which is mounted an embodiment of a system for estimating crop maturity using remote sensing imagery. The system illuminates the scene with a transmission beam and collects a return light produced by reflection of the transmission beam from the target region.

The method 100 of FIG. 1 may be implemented in a SAR system 200 mounted on a platform 202 that moves with respect to a scene 204 along a travel path 206, such as illustrated in FIG. 2. In the illustrated embodiment, the platform 202 is a satellite, the scene 204 is a field of crops, the travel path 206 is an orbital trajectory followed by the satellite, and the SAR system 200 illuminates the scene 204 in a zero-squint side-looking stripmap mode. As noted above, other SAR operation modes can be used in other variants. As also noted above, various SAR techniques and technologies can be implemented in the present techniques (e.g., polarimetry, interferometry). It is appreciated that in some applications, the SAR system 200 may include a plurality of subsystems, each of which mounted on its dedicated platform (e.g., satellite). It is also appreciated that other implementations may use various other remote sensing imaging modalities may be used in addition to or instead of SAR imaging, for example, electro-optical imaging operating in the visible and/or the infrared regions of the electromagnetic spectrum.

Referring still to FIG. 2, as the platform 202 moves along the travel path 206, the beam footprint 208 moves accordingly, thereby illuminating a swath 210 of the scene 204. The SAR system 200 can include a remote sensing imager 212 and a control and processing unit 214. The remote sensing imager 212 can include a transmitter 216 and a receiver 218 The transmitter 216 is configured to transmit electromagnetic waves 220 (e.g., microwave pulses) onto the scene 204 as the platform 202 is moving relative to the scene 204. Return echoes 222 produced by reflection of the transmit electromagnetic waves 220 are collected and detected by the receiver 218 as SAR data. The receiver 218 sends the SAR data to the control and processing unit 214 for generating SAR images from the SAR data. As noted above, the general principles underlying the generation of SAR images from SAR signal data are generally known in the art and need not be described in greater detail herein. Depending on the application, the transmitter 216 and the receiver 218 may be provided as separate devices or combined as a transceiver. The control and processing unit 214 is operatively coupled to the transmitter 216 and the receiver 218 of the remote sensing imager 212 to control and coordinate, at least partly, their operation. The control and processing unit 214 is configured to process, analyze, and store the SAR data recorded by the receiver 218. The control and processing unit 214 is also configured to carry out steps of the method for estimating crop phenology described herein (e.g., using particle filtering). In FIG. 2, the control and processing unit 214 generally includes a processor 224 and a memory 226.

The control and processing unit 214 may be provided within one or more general purpose computers and/or within any other suitable computing devices, implemented in hardware, software, firmware, or any combination thereof, and connected to other components of the SAR system 200 via appropriate wired and/or wireless communication links and ports. Depending on the application, the control and processing unit 214 may be integrated, partly integrated, or physically separate from the other components of the SAR system 200. For example, while the control and processing unit 214 is depicted in FIG. 2 as being physically located on the platform 202, this need not be the case in other embodiments. For example, the control and processing unit 214 may be provided, at least partly, at another location, for example, at a ground-based processing station.

The processor 224 may implement operating systems, and may be able to execute computer programs, also generally known as commands, instructions, functions, processes, software codes, executables, applications, and the like. It should be noted that although the processor 224 in FIG. 2 is depicted as a single entity for illustrative purposes, the term "processor" should not be construed as being limited to a single processor, and accordingly, any known processor architecture may be used. In some implementations, the processor 224 may include a plurality of processing units. Such processing units may be physically located within the same device, or the processor 224 may represent processing functionality of a plurality of devices operating in coordination. For example, the processor 224 may include or be part of: a computer; a microprocessor; a microcontroller; a coprocessor; a central processing unit (CPU); an image signal processor (ISP); a digital signal processor (DSP) running on a system on a chip (SoC); a single-board computer (SBC); a dedicated graphics processing unit (GPU); a special-purpose programmable logic device embodied in a hardware device, such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to electronically process information and operate collectively as a processor.

The memory 226, which can also be referred to as a "computer readable storage medium" is capable of storing computer programs and other data to be retrieved by the processor 224, for example, a response model relating SAR parameters to crop phenology or SAR image data. The terms "computer readable storage medium" and "computer readable memory" are intended to refer herein to a non-transitory and tangible computer product that can store and communicate executable instructions for the implementation of various steps of the methods disclosed herein. The computer readable memory can be any computer data storage device or assembly of such devices, including a random-access memory (RAM); a dynamic RAM; a read-only memory (ROM); an erasable programmable ROM (EPROM); a magnetic storage device, such as a hard disk drive, a solid-state drive, a floppy disk, and a magnetic tape; an optical storage device, such as a compact disc (e.g., a CD or CDROM), a digital video disc (DVD), and a Blu-Ray™ disc; a flash drive memory; and/or other non-transitory memory technologies. A plurality of such storage devices may be provided, as can be appreciated by those skilled in the art. The computer readable memory may be associated with, coupled to, or included in a computer or processor configured to execute instructions contained in a computer program stored in the computer readable memory and relating to various functions associated with the computer.

In accordance with another aspect of the present description, there is provided a non-transitory computer readable storage medium having stored thereon computer executable instructions that, when executed by a processor, cause the processor to perform various steps of a method of estimating and tracking crop maturity with remote sensing imagery, such as described herein.

In accordance with another aspect of the present description, there is provided a computer device for use with a system for estimating and tracking crop maturity using remote sensing imagery such as described herein. The computer device may include a processor and a non-transitory computer readable storage medium such as described herein. The non-transitory computer readable storage medium may be operatively coupled to the processor and may have stored thereon computer readable instructions that, when executed by a processor, cause the processor to perform various steps for controlling the system and/or various steps of methods described herein.

Study for Estimating Canola Phenology Using Synthetic Aperture Radar

A number of aspects of the present techniques were investigated in a study conducted in Canada to estimate canola phenology using SAR. Wet soils in fields of flowering canola are a concern with respect to the development of sclerotinia as this pathogen feeds on the petals of the canola flower. Sclerotinia is a disease that infects canola crops and can result in substantial loss in yields. This is a pathogen that thrives in wet soil conditions, yet depends on the petals of the canola crop as a source of food. As such, understanding when a field of canola is entering this phenological stage can assist in making the decision to use chemical applications to mitigate this risk. However, crop development varies widely from region to region and field to field, due to weather conditions (rainfall and temperature), soil conditions and management decisions (cultivars and planting dates), thus making challenging the monitoring of crop growth over large regions.

RADARSAT-2 quad-polarization and TerraSAR-X dual-polarization SAR data, along with ground truth growth stage data, were used to model the effect of canola growth stages on SAR imagery-extracted parameters, notably by using changes in C- and X-band scattering responses to identify and forecast canola growth changes. These data were collected over three crop growing seasons (2012, 2014, and 2016) in Manitoba, Canada. This analysis provided the foundation of a recursive filtering framework that uses particle filtering for estimation of current canola growth stage, and prediction of stage development, using the two-satellite and multi-mode SAR data. A crop growth stage indicator—crop maturity level—was developed to address the limitations of the BBCH crop growth scale as state variable in recursive estimation. The limitations include the BBCH scale being defined in terms of a small set of integer values, referred to as BBCH codes, which change nonlinearly with time. A selection procedure for SAR polarimetric parameters that was sensitive to both linear and nonlinear dependencies between variables was developed. Based on this procedure, RADARSAT-2 and TerraSAR-X imagery-extracted parameters were identified for canola growth stage estimation. The use of two sensors provided a temporally dense coverage. The crop growth estimator was then tested on unseen data from three sites, one in each of Canada's Prairie provinces of Manitoba, Saskatchewan, and Alberta. When compared against field-observed BBCH data, the independent validation established that the growth estimator was able to accurately determine canola growth stage and date of flowering with high accuracy. Correlation coefficients (r values) between observed and estimated phenology ranged from 0.91 to 0.96. Details regarding experiments, simulations, and results are provided below. It is appreciated that the following description further illustrate aspects of the disclosed principles, but should not be construed as in any way limiting their scope.

1. Study Sites and Data Collection

Canola production in Canada is concentrated in the Prairie Provinces of Manitoba, Saskatchewan, and Alberta. The disclosed study selected three research sites, which were located in Carman (Manitoba) Rosthern (Saskatchewan), and Red Deer (Alberta). Each region differed in terms of climate and soils, and thus seeding dates. As a result, canola growth stage varied among sites.

The phenology model was developed using multi-year SAR satellite and field data for one site in Carman. Specifically, RADARSAT-2 and TerraSAR-X images and ground-truth crop growth stage data were acquired during crop growing seasons in 2012, 2014, and 2016. The data in 2012 and 2016 were from two Soil Moisture Active Passive Validation Experiment (SMAPVEX) field campaigns. During these validation experiments, canola phenology was documented for 7 fields, with growth stage observations made at three sites per field, the location of each site recorded with a GPS. Field sizes at this site range from 20-30 to 50-60 ha. An additional campaign was carried out in 2014, dedicated to gathering observations of phenology for 21 canola fields (one observation per field). These three years of data (2012, 2014 and 2016) were used in the phenology model development. In 2017, field work was initiated to acquire observations to validate the ability of the model to accurately estimate phenology. Data for this validation exercise were collected at the Carman (7 fields), Rosthern (12 fields), and Red Deer locations (11 fields).

The development of the phenology model was based on 110 RADARSAT-2 images and 33 TerraSAR-X images acquired over the Carman site. RADARSAT-2 images were acquired in the Wide Fine Quad-polarization mode with a nominal 10-m resolution and a swath width of 50 km on the ground, at several beam modes in all four polarizations. In 2012, 10 images in FQ2W and FQ10W mode were acquired from April 16 to July 31. In 2014, 7 images in FQ8W and FQ15W mode were acquired from June 20 to August 20. In 2016, 93 images on 31 dates in FQ2W, FQ3W, FQ7W, FQ10W, FQ11W, FQ15W, FQ16W, and FQ2OW were acquired from May 12 to August 27. For TerraSAR-X data, images were acquired in StripMap mode with a nominal 6-m resolution and a swath width of 17 km at several beam modes in dual polarization, including VV and VH. In 2012, 9 images in StripFar006 mode were acquired from May 7 to September 27. In 2014, 11 images in StripNear013 and StripFar004 mode were acquired from June 17 to August 26. In 2016, 13 images in StripNear005, StripNear011 and StripNear013 modes were acquired from May 14 to August 21. The different beam modes in SAR images refer to different incidence angles and pass directions. The 2017 test data set was substantial and included 89 (FQW) and 46 (StripMap) RADARSAT-2 and TerraSAR-X images.

With the exception of the 2012 and 2016 SMAPVEX data sets, a single phenology observation was recorded per field. Crop phenology was assessed using the Biologische Bundesanstalt, Bundessortenamt and CHemical (BBCH) scale given that BBCH is applicable to a wide range of crops. The first digit of a BBCH code indicates the principal stage of development (1 leaf development; 3 stem elongation; 5 inflorescence emergence; 6 flowering; 7 development of fruit; 8 ripening; 9 senescence). The second digit of a BBCH code indicates the percentage (1 for 10%; 9 for 90%) of plants at that specific stage. This dual-digit scale recognizes the variance of growth stage which can be present for a single plant (for example, 30% of flowers emerged from buds or a BBCH of 63). Stages 2 and 4 are not applicable to the spring canola varieties grown in Canada. In 2012, there were 12 data records in 7 fields from June 11 to July 18. In 2014, there were 9 data records in 21 fields from June 6 to August 20. In 2016, there were 12 data records in 7 fields from June 13 to July 20. The location of each observation was recorded using a GPS, with field photos acquired to capture a visual record of crop status. Inflorescence emergence will typically begin 50 days following the seeding date of canola and flowering will generally occur 10 days after that. Field observations began at crop emergence and finished at harvest. Surveyors were requested to collect phenology once per week, on the day of a SAR satellite overpass with RADARSAT-2 or TerraSAR-X, if possible.

2. Modeling Crop Phenology with Crop Maturity

In the disclosed study, a crop growth stage (phenology) estimator was developed that recursively updates crop BBCH codes when new satellite images become available. Crop growth stage estimates were computed using information from planting date up to the present date. Assuming crop growth stage to be a stochastic dynamic process, a state variable linked to crop growth stage was directly estimated using extracted features from satellite sensors. BBCH codes are defined from a small set of integer values specific for each crop. In some applications, the discrete nature of BBCH codes and the fact that it changes nonlinearly with time can make the BBCH scale unsuitable or inconvenient for use as the state variable in crop growth stage estimation.

In order to simplify the estimation procedure, a proxy variable called crop maturity was developed. Growing degree days (GDDs) were used in the calculation as an interim variable to convert BBCH to crop maturity. For a crop to reach a specific BBCH stage, a certain number of GDDs are required. GDDs are calculated by averaging daily maximum and minimum temperatures, and subtracting the assumed minimum or base temperature required for growth to proceed. For example, in the case of canola, the base temperature is 5° C. Conversion from BBCH code to crop maturity was given by the following relationship:

$$\text{Crop maturity}(n) = \frac{\text{Avg. GDDs the crop takes to reach BBCH code } n \text{ from seeding date}}{\text{Avg. GDDs crop lifetime needs}} \quad (6)$$

3. Framework of Proposed Crop Growth Stage Estimator

Figure 3:
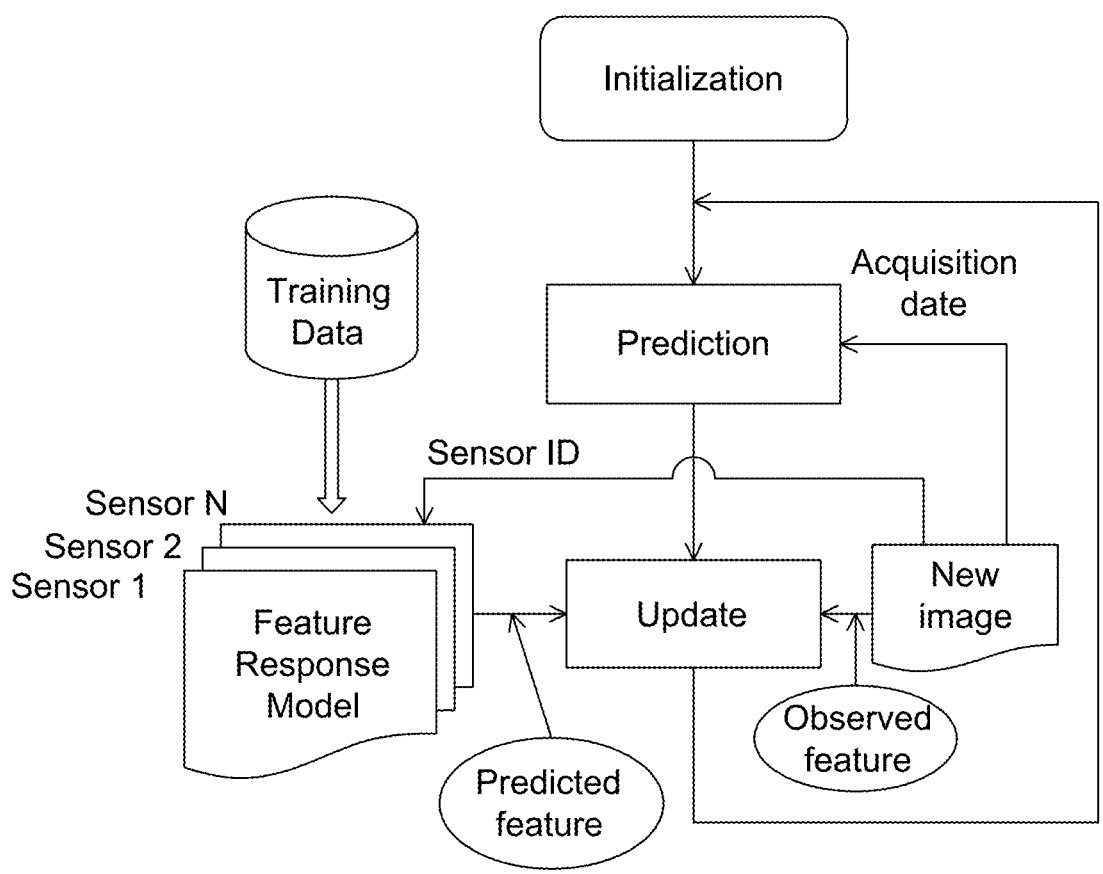
FIG. 3 is a flow diagram of method of estimating crop maturity using remote sensing imagery, in accordance with another embodiment.

The disclosed study assumed that the crop maturity was a first-order Markov process, so that only the probability density function of the crop maturity had to be propagated using a recursive filter. As depicted in FIG. 3, the steps of the recursive filter for crop growth stage estimation were: initialization (A); prediction (B); and update (C). At the initialization stage, the statistics of crop maturity were defined based on a distribution of planting dates of the crop under consideration. The prediction stage was triggered at the arrival of a new satellite image, for example, a SAR image. At this step, using accumulated GDDs, the predicted statistics of crop maturity were computed to transform estimates of maturity to the date of the satellite image. At the update stage, the crop maturity statistics given the measured satellite feature information were computed based on the statistical deviation of expected features from the measured features. The expected features were computed based on a feature response model providing a mapping between SAR data and crop maturity. The feature response model was developed using satellite response and field-observed BBCH data for training. The prediction and updating steps were repeated at the availability of a new satellite image. BBCH codes were determined from the estimated crop maturity by inversion of Eq. (6). Future dates at which crops will reach a specified BBCH level were also predicted. The estimator automatically fused data from different sensors. Additional satellite sensors could be added as long as corresponding feature response models are available.

4. Development of a Feature Response Model for Canola

The performance of the growth stage estimator for crops—canola in the disclosed study—depends on the accuracy of the corresponding feature response model. Information about the GDD range corresponding to different growth stages of canola was obtained from the North Dakota Agricultural Weather Network website (2000-2018). Daily weather data were downloaded from the Environment and Climate Change Canada website, using the weather station closest to the research site. A BBCH versus crop maturity relationship generated based on this initial information was optimized using field-observed BBCH data designated for training The optimization procedure assumes that a shift in GDD scale is possible between different fields due to different planting days.

TABLE 1

List of extracted SAR polarimetric parameters.

| RADARSAT-2 | | TerraSAR-X | |
|---|---|---|---|
| Features | Details | Features | Details |
| Cloude-Pottier decomposition | Alpha, Beta, Delta, Gamma, Lambda, Entropy, Anisotropy | Cloude-Pottier decomposition | Alpha, Delta, Lambda, Entropy, Anisotropy |
| Reflectivity ratios | $S_{HH}/S_{HV}$, $S_{HH}/S_{VV}$, $S_{HV}/S_{VV}$ | Reflectivity ratio VH/VV | $S_{VH}/S_{VV}$ |
| Differential reflectivity ratios | $(S_{HH}-S_{VV})/S_{VV}$, $(S_{HH}-S_{HV})/S_{HV}$, $(S_{HV}-S_{VV})/S_{VV}$ | Differential reflectivity ratio VH/VV | $(S_{VH}-S_{VV})/S_{VV}$ |
| Alternative polarimetric parameters | Conformity coefficient, Scattering predominance, Scattering diversity, Degree of purity, Depolarization index | | |

$S_{HH}$ denotes the intensity of the horizontal transmit and horizontal receive (HH) polarization.
$S_{VV}$ denotes the intensity of the vertical transmit and vertical receive (VV) polarization.
$S_{HV}$ denotes the intensity of the horizontal transmit and vertical receive (HV) polarization.

Full-polarized RADARSAT-2 and dual-polarized TerraSAR-X satellite SAR imagery techniques were used in the crop growth stage estimation. The RADARSAR-2 Fine Quad images were acquired in Single Look Complex (SLC) and the TerraSAR-X StripMap images were acquired in Single Look Slant Range Complex (SSC) format. Radiometric calibration and Gaussian speckle filtering (5×5 window) were performed on the SAR images, and 18 polarimetric parameters for RADARSAT-2 and 7 for TerraSAR-X were derived (Table 1). The polarimetric parameters were orthorectified to 10-m resolution for RADARSAT-2 images, and 5-m resolution for TerraSAR-X images. By reviewing statistics of the canola fields, the polarimetric parameters were consistent in different regions of the study areas. Field-wise statistics, including mean, median, minimum, maximum, mode, variation, and standard deviation, were extracted per canola field.

The Cloude-Pottier decomposition produces parameters characterizing the target's scattering mechanism by scattering type and relative magnitude. In general, three scattering mechanisms are identified: surface scattering, volume scattering, and double-bounce scattering. Entropy characterizes the degree of statistical disorder of scattering mechanisms of the target. Anisotropy describes the relative strength of the second dominant scattering mechanism compared to the third, and lambda represents the mean magnitude of all three scattering mechanisms. The alpha, beta, delta, and gamma parameters characterize the target by eigenvector decomposition of quad-pol RADARSAT-2 data, while alpha and delta are generated in dual-pol TerraSAR-X data. Reflectivity ratio measures the ratios between backscatter returns from different channels, and differential reflectivity measures the differences of backscatters from the channels. Additional polarimetric parameters describing scattering mechanisms of targets were also examined for RADAR-SAT-2 quad-pol images. Conformity coefficient discriminates surface scattering from volume and double-bounce scattering. Scattering predominance and scattering diversity are alternatives to the Cloude-Pottier parameters alpha angle, and entropy, respectively and depolarization index characterizes signal purity.

As noted above, 18 and 7 polarimetric features were extracted from RADARSAT-2 quad-pol SAR data and TerraSAR-X dual-pol SAR data, respectively. Such large sets of features were extracted in order to perform an exhaustive search on suitable features and to achieve satisfactory growth stage estimation performance. However, the feature set corresponding to each satellite were highly correlated. Using all of the features for crop growth estimation would increase computational cost, but would not improve accuracy beyond a certain point. Furthermore, it was found that highly correlated polarimetric features could introduce large biases in estimated growth stage. Thus, the disclosed study involved the development of a robust selection procedure for polarimetric features. The selection of a subset of quad-polarization and dual-polarization features was performed using the maximal information coefficient (MIC). The MIC computes normalized mutual information, a measure for dependency, between two variables. MIC value ranges between [0, 1], with higher value representing higher dependency between variables. Unlike correlation, used notably in PCA, the MIC is sensitive to both linear and nonlinear dependencies between variables, and thus can avoid feeding duplicate information to the dynamic estimator. The use of the MIC helped ensure that each selected feature had at least a moderate dependency with crop maturity level, and that any two selected features did not exhibit a high dependency to each other. Five quad-polarization (RADARSAT-2) features selected for growth stage estimation of canola were alpha angle, anisotropy, delta angle, lambda, and reflectivity ratio $S_{HH}/S_{VV}$. Three dual polarization (TerraSAR-X) features—alpha angle, delta angle, and lambda—were selected.

Figure 4:
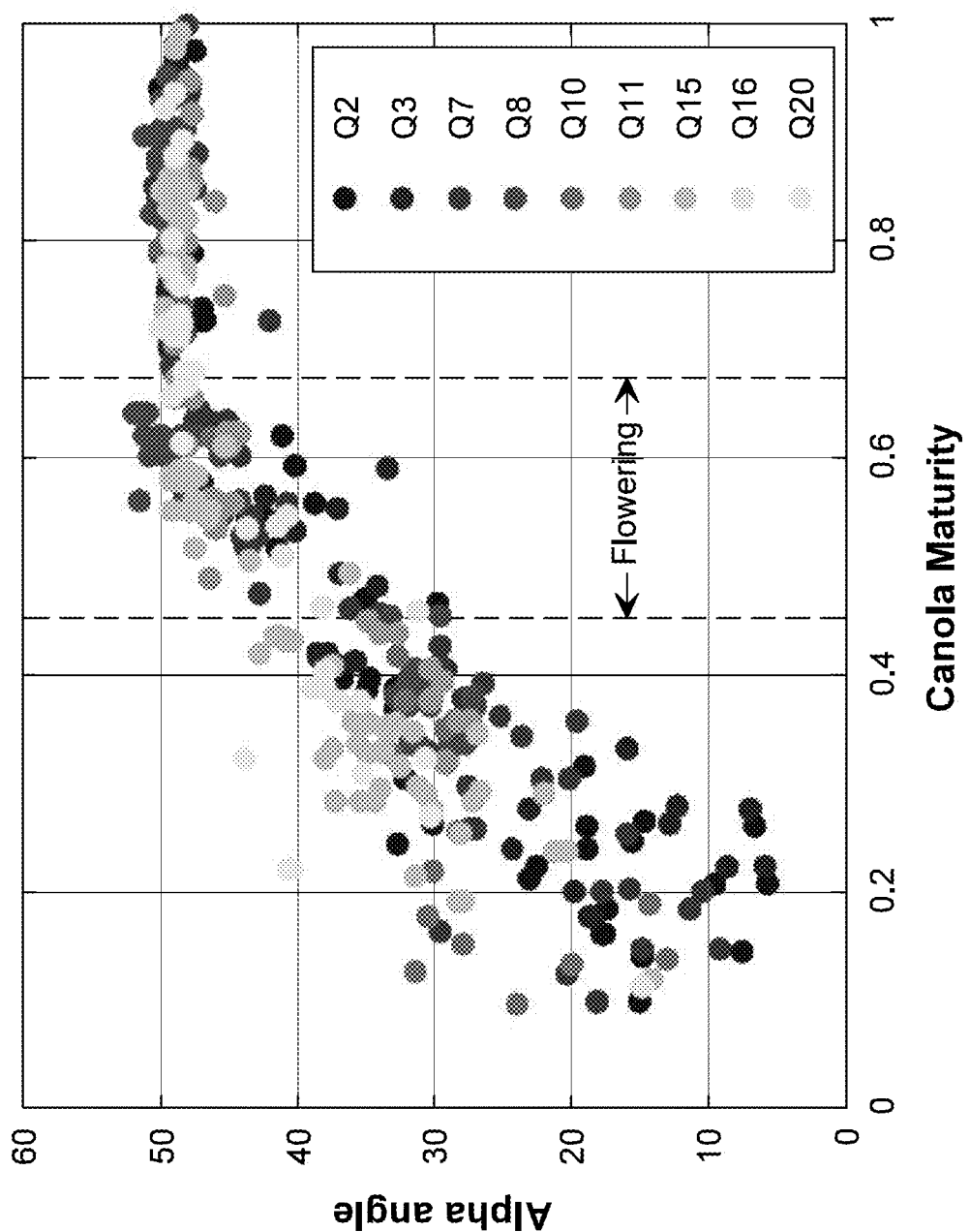
FIG. 4 is a scatter plot of RADARSAT-2 alpha angle, averaged over canola fields, plotted against maturity level from training data, where different grayscale colors represent different quad-pol imaging modes.

FIG. 4 illustrates the relationship obtaining from training data between field-averaged RADAR-SAT-2 alpha angle and maturity level, where different grayscale colors represent different quad-pol imaging modes. Alpha angle describes the dominant scattering mechanism of a target. At the initial stages of canola development, alpha angles below 45° are indicative of slightly rough surfaces. Angle increases through flowering as scattering is now primarily a function of multiple scattering from within the crop canopy. After flowering, the alpha angle is no longer sensitive to changes in maturity given that a dominance of double-bounce scattering is required to push alpha above 50°. The random structure of canola pods and the density of these scattering elements dictate a continued dominance of multiple scattering within the canola canopy. The spread of alpha angle reduces as maturity increases. Scattering from natural targets, such as crops, is rarely a function of a single type of scattering. The spread early in the season captures the variance in scattering among canola fields and image modes. This is anticipated because early in development, scattering would originate from both the soil and crop. The relative contributions of each element (soil and crop) would vary as a function of stage of development. Hence, RADARSAT-2 alpha angle alone would be a good indicator of canola maturity, particularly during flowering. Beyond flowering, the alpha angle is of little or no help in estimating canola maturity. The estimates are improved when information from the other selected features are combined. In the disclosed study, combining all 8 selected polarimetric features from both RADARSAT-2 and TerraSAR-X produced the highest accuracy of canola growth stage estimation.

5. Implementation for Estimating and Predicting Phenology of Canola

Given the nonlinear relationship between crop maturity and SAR feature statistics (as illustrated in FIG. 4) a particle filter was used for crop growth estimation. Particle filtering is a sequential Monte Carlo method that is based on a point-mass representation of the probability densities of the state variables. The state variable in the disclosed study was crop maturity. Particle filtering provides near-optimal solutions for estimation problems including nonlinear and non-Gaussian state transitions or measurement models. In these scenarios, traditional Kalman filtering techniques may fail or be less effective.

Steps shown in FIG. 3 follow the particle filter used in the disclosed study. During initialization (A), random samples or particles were drawn based on the knowledge of the range of planting conditions for the crops under study. During prediction (B), the particles were propagated using accumulated GDD data so that they can represent the probability density of canola maturity at the acquisition date of a satellite image. In the updating step (C), the likelihood of the observed satellite features was computed for each particle assuming its corresponding crop maturity value to be accurate. Following that, the particles were resampled using the computed likelihoods as weights. The resampled particles represented the estimated probability density of crop maturity at the date of the image acquisition. As each new image became available, the past estimates of growth stages could be updated. In the disclosed study, the update of the past estimates was performed outside the framework of particle filtering. Rather, fixed-interval smoothing was used to update the past crop maturity estimates.

6. Results and Discussion

The recursive filtering framework developed in the disclosed study provides daily estimates of canola growth stage. The estimates include an estimate of the stage of growth on the current date, a prediction of growth stages for future dates, and an update of stage estimated in the past. The estimates output by the model can be expressed in terms of the BBCH scale.

Figure 5A:
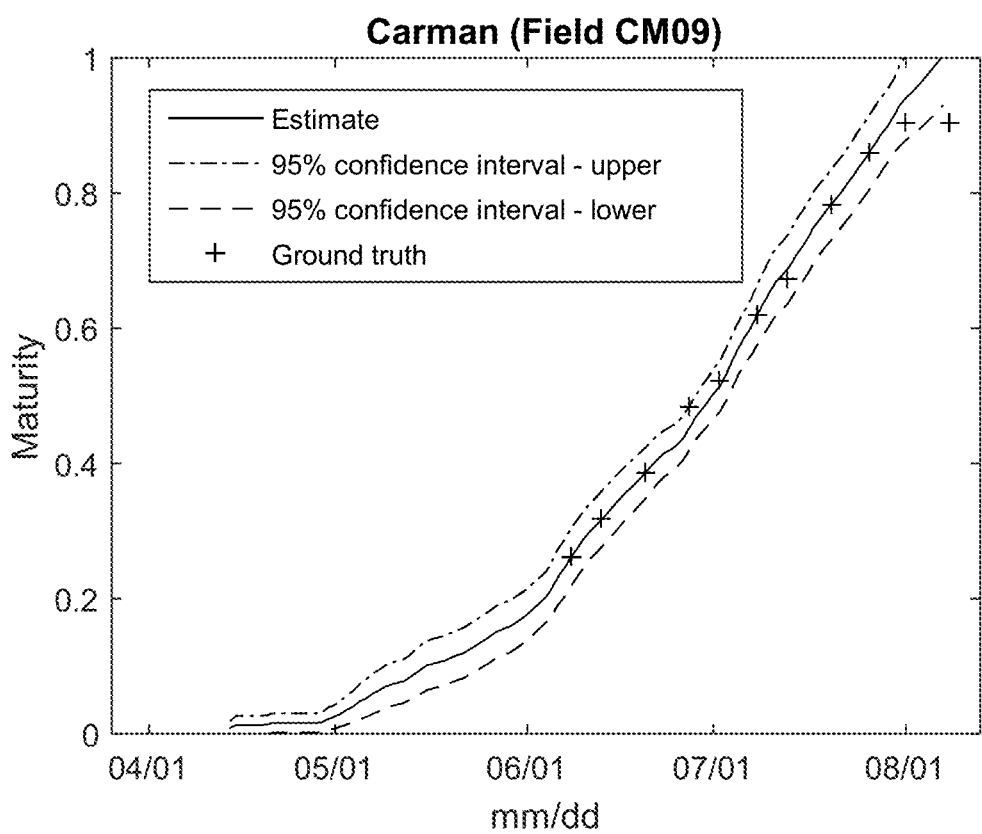
FIGS. 5A to 5C are graphs of observed and estimated crop maturities plotted as a function of time over a growing season for one typical field from each test site of a study disclosed herein (FIG. 5A: Carman, Manitoba.
Figure 5B:
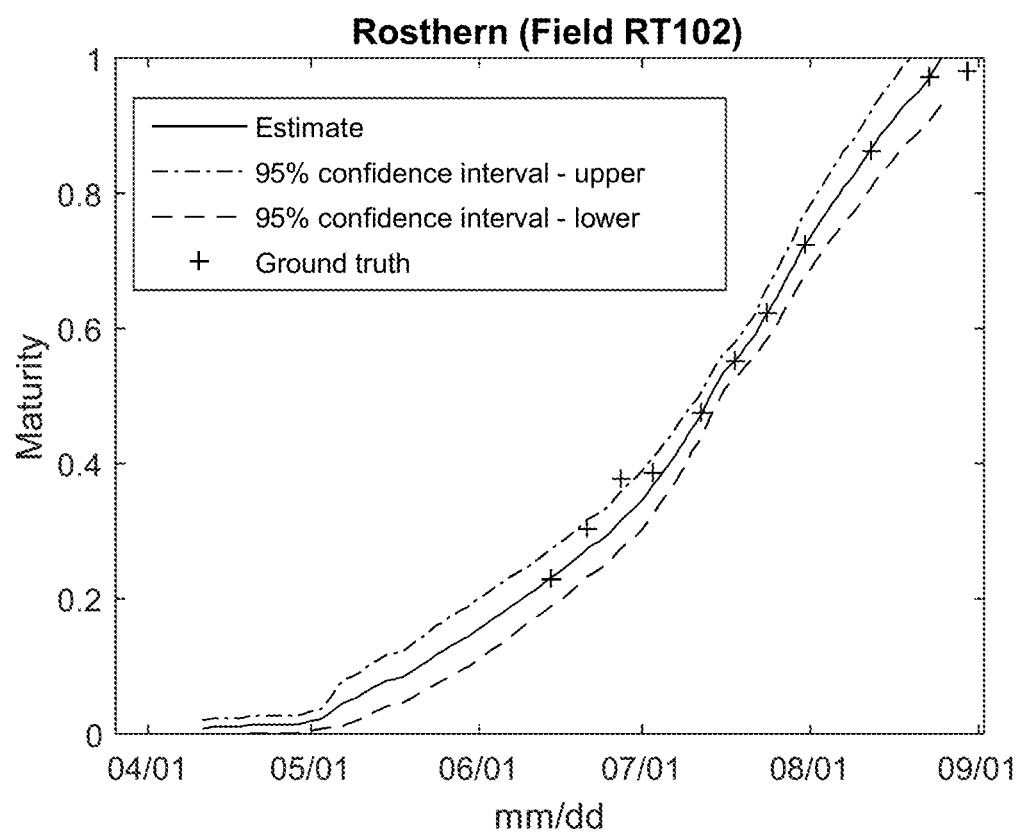
Figure 5C:
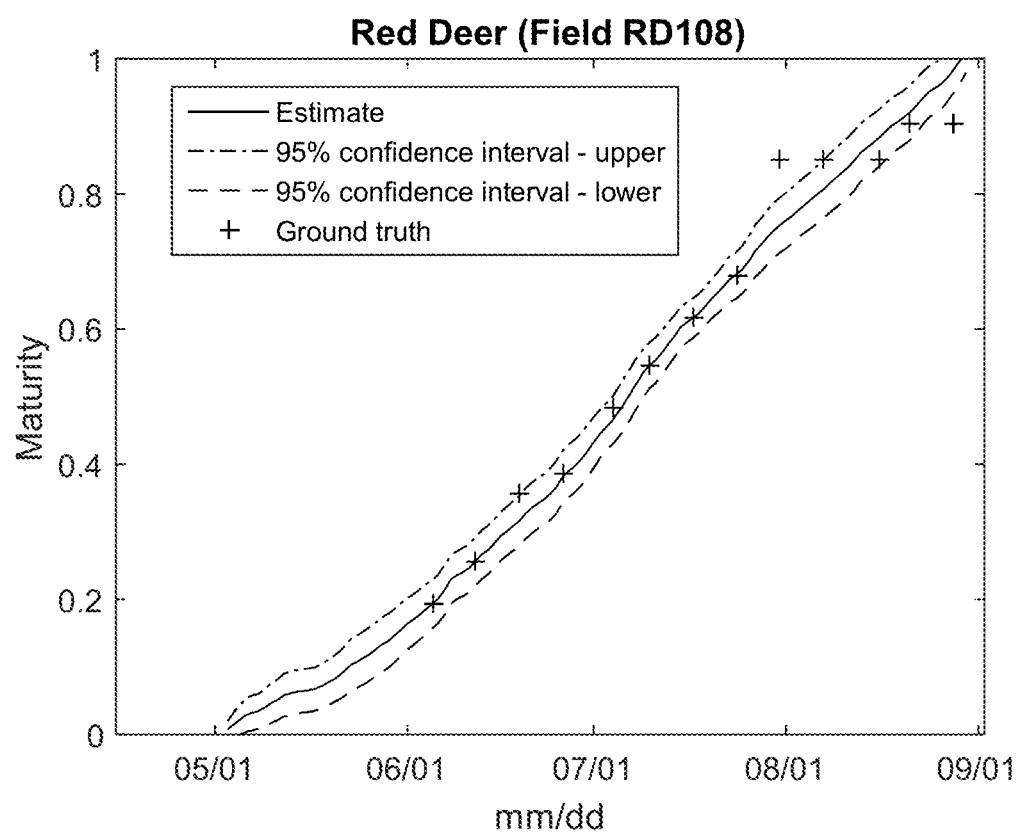

The crop growth estimator was trained on data from Carman (2012, 2014, and 2016), then used to estimate BBCH scale for fields surveyed in 2017 in Manitoba, Saskatchewan and Alberta. The 2017 observations served as independent validation. FIGS. 5A to 5C plots the evolution of observed and estimated crop maturities on a daily time-step during the entire growing season for one typical field from each test site (FIG. 5A: Carman, Manitoba; FIG. 5B:

Rosthern, Saskatchewan; FIG. 5C: Red Deer, Alberta). The upper and lower confidence limits are indicated in terms of calendar days. The date of each RADAR-SAT-2 and TerraSAR-X acquisition is noted, indicating when the crop maturity is updated (for current date, and retroactively) using the satellite feature information. Also marked are the ground-truth crop maturity values, converted from field-observed BBCH values. To quantify the accuracy of crop maturity estimates, errors were calculated as the difference (in days) between the day on which a crop maturity was observed and when the crop was estimated to reach that same crop maturity. For both the Manitoba and Saskatchewan fields, estimated phenology closely matches observed phenology through the entire growing season, up to and including ripening (crop maturity close to 1). The standard errors in prediction of crop maturity in calendar days were 2.4 and 2.0 for the Manitoba (FIG. 5A) and Saskatchewan (FIG. 5B) fields, respectively. It is noted that outliers present in the ground truth observations, including the ones indicating a reversal of crop growth, contribute to part of these errors. For the Alberta field (FIG. 5C), phenology was well characterized as well, and divergence between estimates and observations during ripening may be due to observation error given that BBCH was observed as static over a number of weeks. The standard error in prediction of crop maturity in calendar days was 5.6 for the Alberta field. For all three sites, the model properly identified the important period of flowering (BBCH 60-69; crop maturity ranging from 0.44 to 0.66). Accurate estimates of the onset of flowering are of particular importance to assess the risk that sclerotinia pathogens will feed off from canola petals, which are necessary for survival.

Figure 6A:
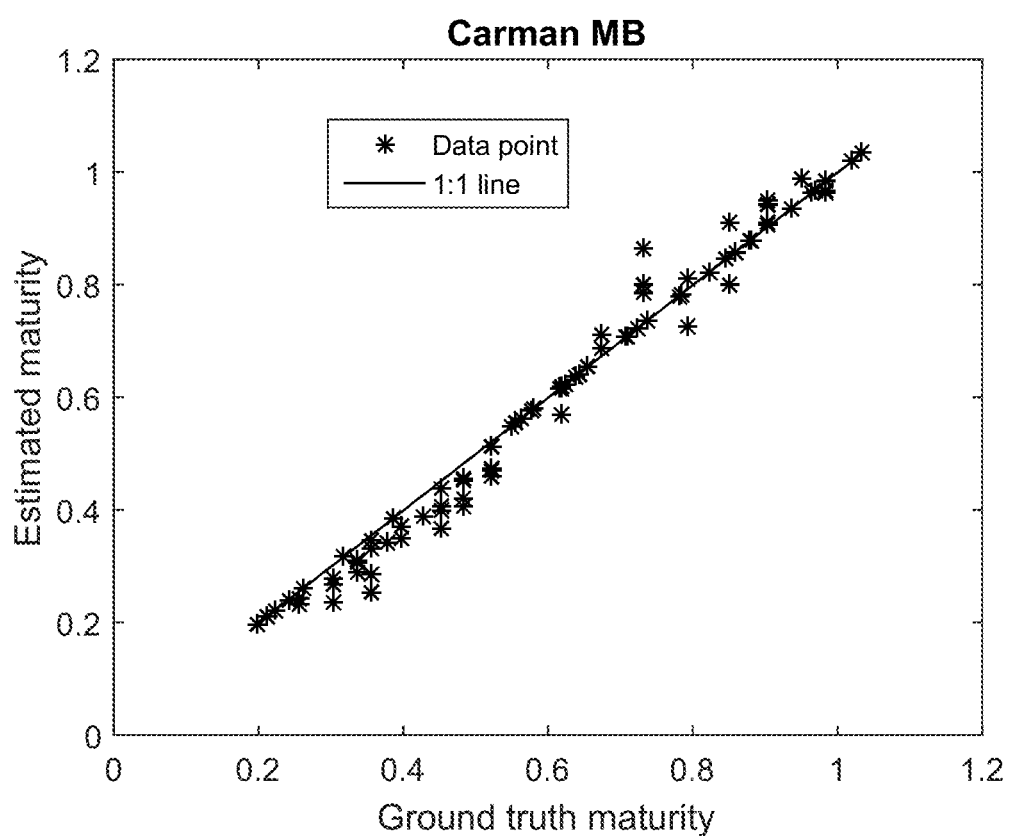
FIGS. 6A to 6C are graphs comparing observed ground truth crop maturity (converted from field-observed BBCH) and estimated crop maturity over the growing season for all fields in each test site of the disclosed study (FIG. 6A: Carman, Manitoba.
Figure 6B:
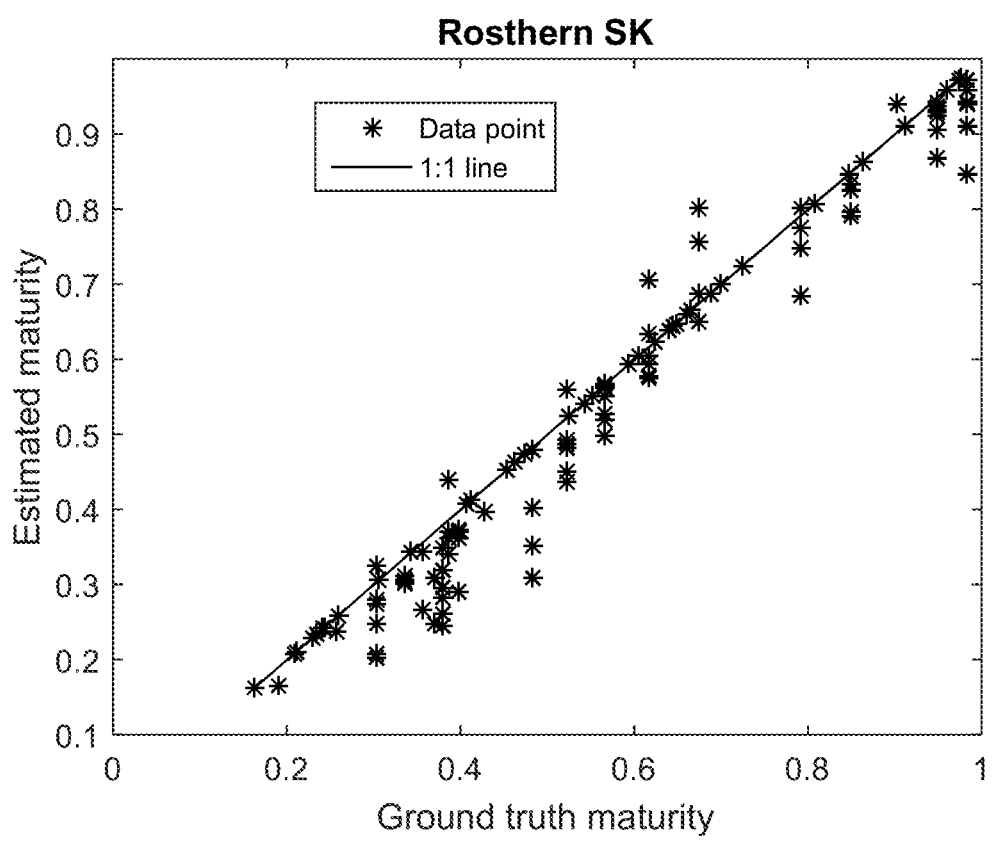
Figure 6C:
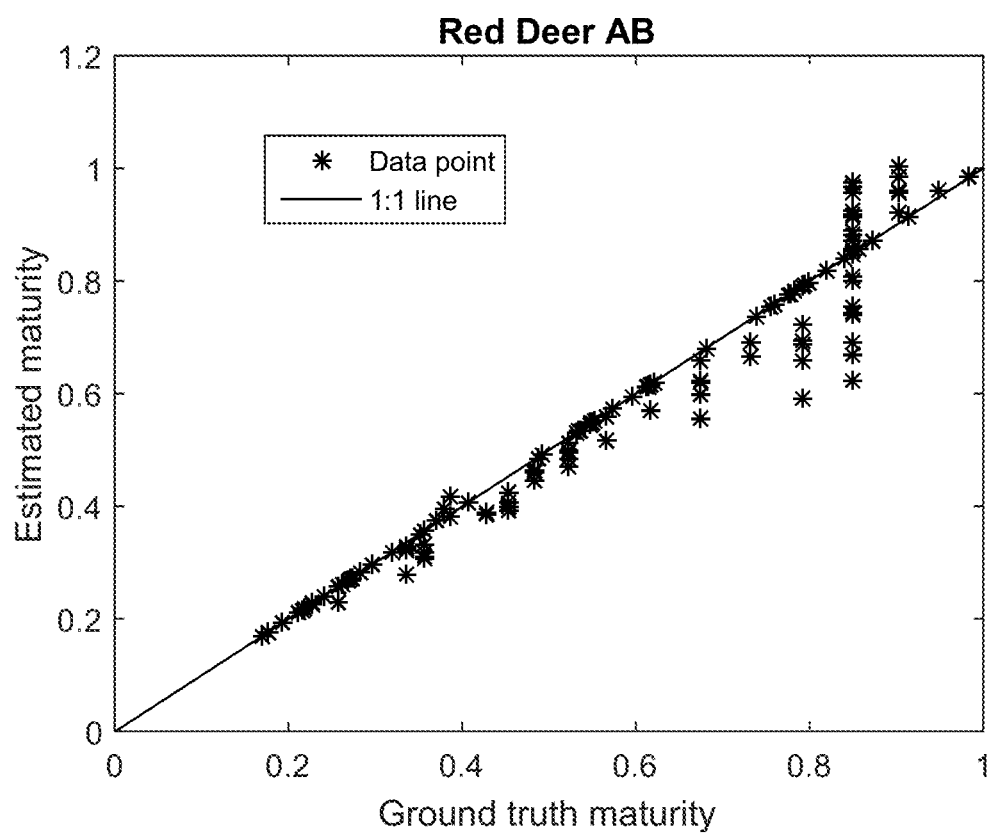

FIGS. 6A to 6C provides a comparison of observed ground truth crop maturity (converted from field-observed BBCH) and estimated crop maturity for all fields in each site, spanning the entire 2017 growing season (FIG. 6A: Carman, Manitoba; FIG. 6B: Rosthern, Saskatchewan; FIG. 6C: Red Deer, Alberta). The graphs from all three study sites clearly show a strong linear relationship between observations and estimates. Estimation errors were higher for ground truth maturity level values of 0.75 and more due to error in field-BBCH measurements, such as no change for weeks, particularly at the Alberta site. Considering all fields in each site, standard errors in prediction of crop maturity in calendar days were 3.6 and 5.0 for the Manitoba (7 fields) and Saskatchewan (12 fields) sites. For the Alberta (11 fields) sites, the standard error was 8.3 calendar days, which would decrease to 4.1 calendar days if results were limited to ground truth maturity levels below 0.75. The results from all three sites indicate that canola phenology can be accurately estimated with the crop growth model developed in this study. The good performance of this method in different cropping regions is a significant advantage given that many methods are tuned for specific test sites and thus are limited in their operational use.

Numerous modifications could be made to the embodiments described above without departing from the scope of the appended claims.

The invention claimed is:

1. A method of estimating crop maturity using remote sensing imagery, the method comprising:
    providing a remote sensing image of crops acquired at an image acquisition time;
    predicting a maturity level of the crops at the image acquisition time based on input crop maturity data from an input time and weather-based growth indication data from between the input time and the image acquisition time, wherein the weather-based growth indication data comprises heat accumulation data accumulated between the input time and the acquisition time, and wherein the heat accumulation data comprises growing degree day data; and
    updating the predicted maturity level to an updated maturity level based on the remote sensing image and a response model relating remote sensing image information to crop maturity information.

2. The method of claim 1, wherein the providing, predicting, and updating steps are performed sequentially and iteratively, for N iterations, N being an integer greater than one, and wherein the updated maturity level at the image acquisition time from the $n^{th}$ iteration is used in providing the input crop maturity data at the input time for the $(n+1)^{th}$ iteration, n ranging from 1 to N−1.

3. The method of claim 2, further comprising providing the input crop maturity data for the first iteration based on a distribution of crop planting dates that defines the input time for the first iteration.

4. The method of claim 1, wherein the predicting and updating steps comprise performing a particle filtering operation.

5. The method of claim 4, wherein the particle filtering operation comprises:
    generating, as the predicted maturity level, a set of particles representing a probability density function of a state variable indicative of the crop maturity at the image acquisition time, each particle in the set of particles having a state value and a weight based on the input crop maturity data and the weather-based growth indication data; and
    determining the updated maturity level by adjusting the weights of the particles based on a likelihood function by using the remote sensing image in the response model.

6. The method of claim 1, wherein the remote sensing image comprises a synthetic aperture radar (SAR) image.

7. The method of claim 6, wherein the SAR image comprises a polarimetric SAR image, and wherein the remote sensing image information comprises a SAR polarimetric parameter.

8. The method of claim 1, further comprising converting the updated maturity level of the crops to a Biologische Bundesanstalt, Bundessortenamt and CHemical (BBCH) code by relating the updated maturity level to a ratio of a number of growing degree days associated with the crops for reaching a particular BBCH code to a number of growing degree days associated with a lifetime of the crops.

9. The method of claim 1, further comprising predicting a subsequent maturity level of the crops at a subsequent time after the image acquisition time based on the updated maturity level and weather-based growth indication data from between the image acquisition time and the subsequent time.

10. The method of claim 1, further comprising predicting a past maturity level of the crops at a past time before the image acquisition time based on the updated maturity level and past data, the past data comprising weather-based growth indication data from between the past time and the image acquisition time, or remote sensing image data acquired between the past time and the image acquisition time, or a combination thereof.

11. The method of claim 1, further comprising adjusting the updated maturity level based on another remote sensing image acquired at a different time than the image acquisition time of the remote sensing image.

12. The method of claim 1, further comprising predicting, based on the updated maturity level, a time at which the crops have reached or will reach a specified crop growth stage.

13. The method of claim 1, wherein the input time is before the image acquisition time.

14. The method of claim 1, wherein providing the remote sensing image comprises acquiring the remote sensing image with a remote sensing imager.

15. A non-transitory computer readable storage medium having stored thereon computer executable instructions that, when executed by a processor, cause the processor to perform a method comprising:
    receiving a remote sensing image of crops acquired at an image acquisition time;
    predicting a maturity level of the crops at the image acquisition time based on input crop maturity data from an input time and weather-based growth indication data from between the input time and the image acquisition time, wherein the weather-based growth indication data comprises growing degree day data accumulated between the input time and the acquisition time; and
    updating the predicted maturity level to an updated maturity level based on the remote sensing image and a response model relating remote sensing image information to crop maturity information.

16. The non-transitory computer readable storage medium of claim 15, wherein the providing, predicting, and updating steps are performed sequentially and iteratively, for N iterations, N being an integer greater than one, and wherein the updated maturity level at the image acquisition time from the $n^{th}$ iteration is used in providing the input crop maturity data at the input time for the $(n+1)^{th}$ iteration, n ranging from 1 to N−1.

17. The non-transitory computer readable storage medium of claim 16, further comprising providing the input crop maturity data for the first iteration based on a distribution of crop planting dates that defines the input time for the first iteration.

18. The non-transitory computer readable storage medium of claim 16, wherein the predicting and updating steps comprise performing a particle filtering operation, the particle filtering operation comprising:
    generating, as the predicted maturity level, a set of particles representing a probability density function of a state variable indicative of the crop maturity at the image acquisition time, each particle in the set of particles having a state value and a weight based on the input crop maturity data and the weather-based growth indication data; and
    determining the updated maturity level by adjusting the weights of the particles based on a likelihood function by using the remote sensing image in the response model.

19. The non-transitory computer readable storage medium of claim 15, wherein the remote sensing image comprises a synthetic aperture radar (SAR) image.

20. The non-transitory computer readable storage medium of claim 15, wherein the method further comprises predicting a subsequent maturity level of the crops at a subsequent time after the image acquisition time based on the updated maturity level and weather-based growth indication data from between the image acquisition time and the subsequent time.

21. The non-transitory computer readable storage medium of claim 15, wherein the method further comprises predicting a past maturity level of the crops at a past time before the image acquisition time based on the updated maturity level and past data, the past data comprising weather-based growth indication data from between the past time and the image acquisition time, or remote sensing image data acquired between the past time and the image acquisition time, or a combination thereof.

22. A computer device for estimating crop maturity using remote sensing imagery, the computer device comprising:
    a processor; and
    the non-transitory computer readable storage medium of claim 15, the non-transitory computer readable storage medium being operatively coupled to the processor.

23. A system for estimating crop maturity using remote sensing imagery, the system comprising:
    a remote sensing imager configured for acquiring a remote sensing image of crops at an image acquisition time;
    a control and processing unit arranged in communication with the remote sensing imager, the control and processing unit being configured for:
        receiving the remote sensing image from the remote sensing imager;
        predicting a maturity level of the crops at the image acquisition time based on input crop maturity data from an input time and weather-based growth indication data from between the input time and the image acquisition time, wherein the weather-based growth indication data comprises heat accumulation data accumulated between the input time and the acquisition time, and wherein the heat accumulation data comprises growing degree day data; and
        updating the predicted maturity level to an updated maturity level based on the remote sensing image and a response model relating remote sensing image information to crop maturity information.

24. A method of estimating crop maturity using remote sensing imagery, the method comprising:
    providing a remote sensing image of crops acquired at an image acquisition time;
    predicting a maturity level of the crops at the image acquisition time based on input crop maturity data from an input time and weather-based growth indication data from between the input time and the image acquisition time; and
    updating the predicted maturity level to an updated maturity level based on the remote sensing image and a response model relating remote sensing image information to crop maturity information,
    wherein the providing, predicting, and updating steps are performed sequentially and iteratively, for N iterations, N being an integer greater than one, and wherein the updated maturity level at the image acquisition time from the $n^{th}$ iteration is used in providing the input crop maturity data at the input time for the $(n+1)^{th}$ iteration, n ranging from 1 to N−1, and
    wherein the method further comprises providing the input crop maturity data for the first iteration based on a distribution of crop planting dates that defines the input time for the first iteration.

25. The method of claim 24, wherein the predicting and updating steps comprise performing a particle filtering operation.

26. The method of claim 25, wherein the particle filtering operation comprises:
    generating, as the predicted maturity level, a set of particles representing a probability density function of a state variable indicative of the crop maturity at the image acquisition time, each particle in the set of particles having a state value and a weight based on the input crop maturity data and the weather-based growth indication data; and determining the updated maturity level by adjusting the weights of the particles based on a likelihood function by using the remote sensing image in the response model.

27. The method of claim 24, wherein the remote sensing image comprises a synthetic aperture radar (SAR) image.

28. The method of claim 24, further comprising predicting a subsequent maturity level of the crops at a subsequent time after the image acquisition time based on the updated maturity level and weather-based growth indication data from between the image acquisition time and the subsequent time.

29. The method of claim 24, further comprising predicting a past maturity level of the crops at a past time before the image acquisition time based on the updated maturity level and past data, the past data comprising weather-based growth indication data from between the past time and the image acquisition time, or remote sensing image data acquired between the past time and the image acquisition time, or a combination thereof.

30. A non-transitory computer readable storage medium having stored thereon computer executable instructions that, when executed by a processor, cause the processor to perform a method of claim 24.

31. A system for estimating crop maturity using remote sensing imagery, the system comprising:
   a remote sensing imager configured for acquiring a remote sensing image of crops at an image acquisition time;
   a control and processing unit arranged in communication with the remote sensing imager, the control and processing unit comprising:
   a processor; and
   the non-transitory computer readable storage medium of claim 30.

32. A method of estimating crop maturity using remote sensing imagery, the method comprising:
   providing a remote sensing image of crops acquired at an image acquisition time;
   predicting a maturity level of the crops at the image acquisition time based on input crop maturity data from an input time and weather-based growth indication data from between the input time and the image acquisition time; and
   updating the predicted maturity level to an updated maturity level based on the remote sensing image and a response model relating remote sensing image information to crop maturity information,
   wherein predicting and updating steps comprise performing a particle filtering operation, the particle filtering operation comprising:
   generating, as the predicted maturity level, a set of particles representing a probability density function of a state variable indicative of the crop maturity at the image acquisition time, each particle in the set of particles having a state value and a weight based on the input crop maturity data and the weather-based growth indication data; and
   determining the updated maturity level by adjusting the weights of the particles based on a likelihood function by using the remote sensing image in the response model.

33. The method of claim 32, wherein the remote sensing image comprises a synthetic aperture radar (SAR) image.

34. The method of claim 32, further comprising predicting a subsequent maturity level of the crops at a subsequent time after the image acquisition time based on the updated maturity level and weather-based growth indication data from between the image acquisition time and the subsequent time.

35. The method of claim 32, further comprising predicting a past maturity level of the crops at a past time before the image acquisition time based on the updated maturity level and past data, the past data comprising weather-based growth indication data from between the past time and the image acquisition time, or remote sensing image data acquired between the past time and the image acquisition time, or a combination thereof.

36. A non-transitory computer readable storage medium having stored thereon computer executable instructions that, when executed by a processor, cause the processor to perform a method of claim 32.

37. A system for estimating crop maturity using remote sensing imagery, the system comprising:
   a remote sensing imager configured for acquiring a remote sensing image of crops at an image acquisition time;
   a control and processing unit arranged in communication with the remote sensing imager, the control and processing unit comprising:
   a processor; and
   the non-transitory computer readable storage medium of claim 36.

* * * * *